United States Patent
Gomi

(10) Patent No.: US 7,312,886 B2
(45) Date of Patent: Dec. 25, 2007

(54) PRINTER CONTROL METHOD, INFORMATION PROCESSING APPARATUS, PROGRAM, AND STORAGE MEDIUM

(75) Inventor: Tomohiro Gomi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 786 days.

(21) Appl. No.: 10/303,835

(22) Filed: Nov. 26, 2002

(65) Prior Publication Data

US 2003/0103235 A1   Jun. 5, 2003

(30) Foreign Application Priority Data

Dec. 3, 2001 (JP) ............................ 2001-368744
Dec. 3, 2001 (JP) ............................ 2001-368745
Oct. 29, 2002 (JP) ............................ 2002-314313

(51) Int. Cl.
*G06F 15/00* (2006.01)

(52) U.S. Cl. ............... 358/1.15; 358/1.1; 358/1.13; 358/1.14; 707/102

(58) Field of Classification Search .............. 358/1.15, 358/1.1, 1.13, 1.14; 707/102
See application file for complete search history.

(56) References Cited

U.S. PATENT DOCUMENTS

| | | | |
|---|---|---|---|
| 6,348,971 B2* | 2/2002 | Owa et al. | 358/1.15 |
| 6,552,813 B2* | 4/2003 | Yacoub | 358/1.1 |
| 6,856,413 B1* | 2/2005 | Roosen et al. | 358/1.15 |
| 6,909,520 B2* | 6/2005 | Ogino | 358/1.15 |
| 2002/0163666 A1* | 11/2002 | Iwata et al. | 358/1.15 |

FOREIGN PATENT DOCUMENTS

JP        2001-290623        10/2001

* cited by examiner

*Primary Examiner*—Aung S. Moe
*Assistant Examiner*—Vincent Rudolph
(74) *Attorney, Agent, or Firm*—Fitzpatrick, Cella, Harper & Scinto

(57) ABSTRACT

In order to manage management information of virtual printers and real printers in an easy-to-understand manner in a printing system which employs a plurality of printers, the present invention includes a recognition step of recognizing a virtual printer selected from a plurality of virtual printers; an identification step of identifying member printers associated with the virtual printer recognized in the recognition step; and a display control step of displaying information about the member printers associated with the virtual printer and identified in the identification step.

13 Claims, 34 Drawing Sheets

FIG. 13A

| CLASSIFICATION | NORMAL | PAUSE (SPOOLER) | PAUSE (PORT) | OFFLINE | INFORMATION | ERROR | WARNING | SERVICE CALL |
|---|---|---|---|---|---|---|---|---|
| LASER BEAM PRINTER | | | | | | | | |
| LASER BEAM PRINTER (COLOR) | | | | | | | | |
| MULTIFUNCTION DEVICE | | | | | | | | |
| MULTIFUNCTION DEVICE (COLOR) | | | | | | | | |
| MIB MACHINE (PRODUCT FROM OTHER VENDORS) | | | | | | | | |

FIG. 13B

| | NORMAL | PAUSE (SPOOLER) | PAUSE (PORT) |
|---|---|---|---|
| PROPORTIONAL DISTRIBUTION ICON | | | |
| COLOR/MONOCHROME DISTRIBUTION ICON | | | |
| BROADCAST ICON | | | |
| PROXY ICON | | | |

FIG. 18

| | |
|---|---|
| NAME OF VIRTUAL PRINTER | 1801 |
| MODE TYPE OF VIRTUAL PRINTER | 1802 |
| NAMES OF INDIVIDUAL REGISTERED MEMBER PRINTERS | 1803 |
| NAME OF REGISTERED MEMBER PRINTER 1 | 1804 |
| . . . . . . . . . | |
| SIZE OF SUPPLEMENTARY INFORMATION ABOUT NAME OF REGISTERED MEMBER PRINTER 1 | 1805 |
| SUPPLEMENTARY INFORMATION ABOUT NAME OF REGISTERED MEMBER PRINTER 1 | 1806 |
| . . . . . . . . . | |

FIG. 19

| | |
|---|---|
| PRINTER NAME | 1901 |
| PRINTER DRIVER NAME (MODEL NAME) | 1902 |
| STATUS CODE CLASSIFICATION TYPE | 1903 |
| PRINTER CLASSIFICATION TYPE | 1904 |
| I/F CALL TYPE | 1905 |
| SIZE OF SUPPLEMENTARY INFORMATION | 1906 |
| SUPPLEMENTARY INFORMATION ABOUT PRINTER | 1907 |
| . . . . . . . . . | |

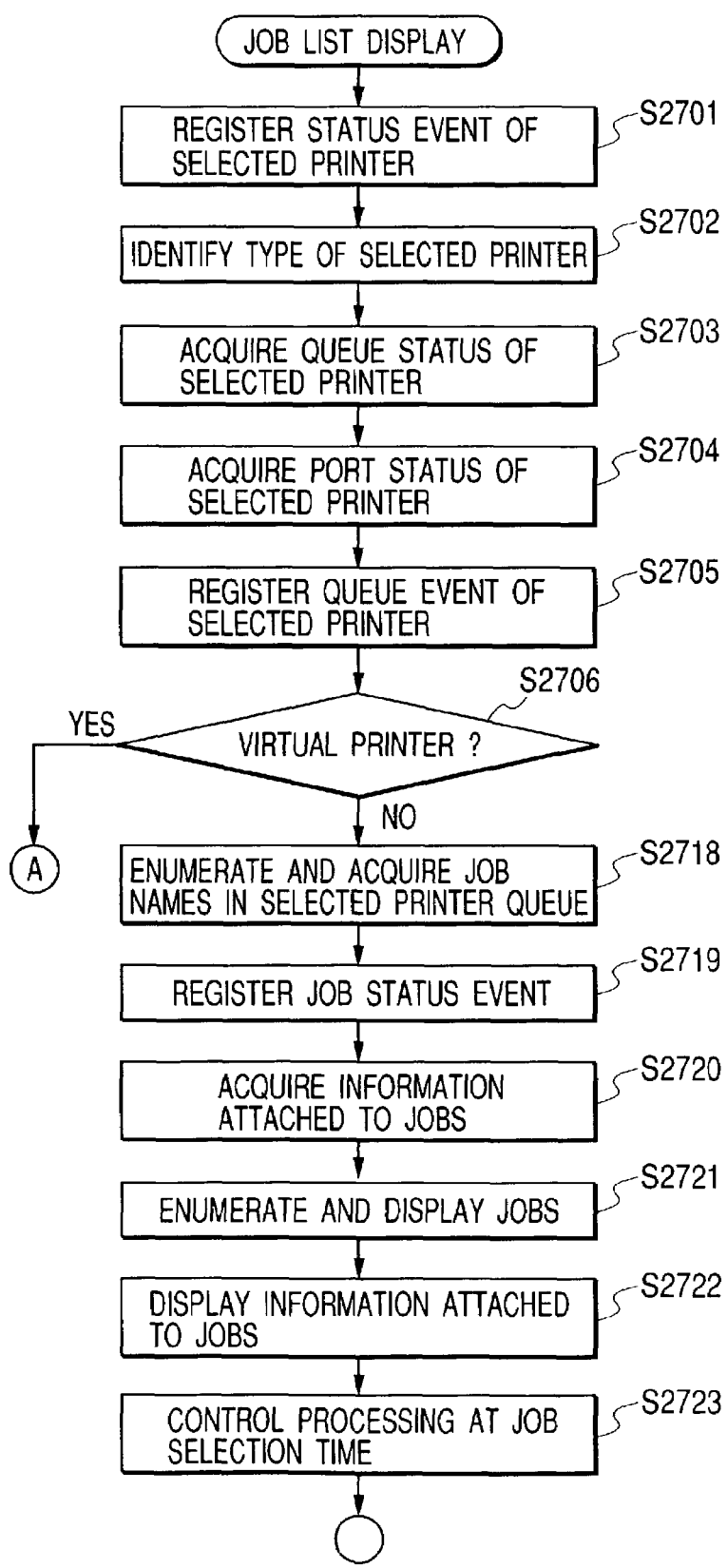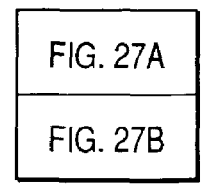

FIG. 29

| | |
|---|---|
| NAME OF VIRTUAL PRINTER | 1801 |
| MODE TYPE OF VIRTUAL PRINTER | 1802 |
| NAMES OF INDIVIDUAL REGISTERED MEMBER PRINTERS | 1803 |
| NAME OF REGISTERED MEMBER PRINTER 1 | 1804 |
| . . . . . . . . . | |
| SIZE OF SUPPLEMENTARY INFORMATION ABOUT REGISTERED MEMBER PRINTER 1 | 1805 |
| SUPPLEMENTARY INFORMATION ABOUT REGISTERED MEMBER PRINTER 1 | 1806 |
| . . . . . . . . . | |

FIG. 30

| | |
|---|---|
| PRINTER NAME | 1901 |
| PRINTER DRIVER NAME (MODEL NAME) | 1902 |
| STATUS CODE CLASSIFICATION TYPE | 1903 |
| PRINTER CLASSIFICATION TYPE | 1904 |
| I/F CALL TYPE | 1905 |
| SIZE OF SUPPLEMENTARY INFORMATION | 1906 |
| SUPPLEMENTARY INFORMATION ABOUT PRINTER | 1907 |
| . . . . . . . . . | |

FIG. 31

| | |
|---|---|
| INTERMEDIATE FILE NAME | ~2001 |
| INTERMEDIATE FILE ID | ~2002 |
| VIRTUAL PRINTER NAME | ~2003 |
| SUPPLEMENTARY INFORMATION ATTACHED TO INTERMEDIATE FILE (INCLUDING STATUS AND OUTPUT PRINTER NAME) | ~2004 |
| NUMBER OF DERIVED JOBS | ~2005 |
| PROCESSING MODE OF DERIVED JOB (INCLUDING DISTRIBUTED, COLOR/MONOCHROME DISTRIBUTED, PROXY, AND BROADCAST) | ~2006 |
| SUPPLEMENTARY INFORMATION ATTACHED TO DERIVED JOB (INCLUDING STATUS AND OUTPUT PRINTER NAME) | ~2007 |
| . . . | |

FIG. 32

| | |
|---|---|
| JOB NAME | ~2101 |
| JOB ID | ~2102 |
| OUTPUT DEVICE INFORMATION (DERIVED JOB) | ~2103 |
| JOB CLASSIFICATION TYPE (PDL, DERIVED) | ~2104 |
| SIZE OF SUPPLEMENTARY INFORMATION | ~2105 |
| SUPPLEMENTARY INFORMATION ATTACHED TO JOB | ~2106 |
| . . . | |

FIG. 36

| STATUS | ICON 32×32 | ICON 16×16 | DESCRIPTION |
|---|---|---|---|
| WAITING FOR PROCESSING | | ◇ | WAITING FOR LOGICAL PROCESSING |
| PROCESSING | | ◇ | LOGICAL PROCESSING IS GOING ON |
| WAITING FOR PRINTING: WAITING FOR FAX TRANSMISSION | | ◇ | LOGICAL PROCESSING IS COMPLETED |
| PRINTING: FAXING | | ▶ | PRINTING IS BEING DONE |
| PRINTING STOPPED: FAX STOPPED | | ‖ | PAUSE |
| JOB ERROR | | ! | JOB-RELATED ERROR OCCURRED |
| STANDBY | | ⋈ | INTERRUPT OCCURRED |
| COMPLETED | | - | JOB ENDED |
| DELETING | | × | DELETING |
| DELETED | | × | DELETION IS COMPLETED |
| LOCKED | | 🔒 | WAITING FOR SECURE JOB PASSWORD |
| TIMER-CONTROLLED TRANSMISSION SET | IN PREPA-RATION | IN PREPA-RATION | JOB, OF WHICH FAX RESERVATION HAS BEEN COMPLETED |
| SAVING | | ▷ | SAVING |
| SAVED | | ◇ | SAVED |
| DELETED | | × | JOB HAS BEEN SCHEDULED FOR FAX TRANSMISSION |
| MISSING | (INTERIM) | ? (INTERIM) | JOB IS MISSING WITHOUT COMPLETION NOTIFICATION AFTER INPUT: JOB IS MARKED FOR REPRINTING |

FIG. 37

| STATUS | ICON 32×32 | 16×16 | DESCRIPTION |
|---|---|---|---|
| SPOOLING | | ▷ | SPOOLING HAS STARTED |
| WAITING FOR TRANSFER | | ◇ | SPOOLING HAS ENDED |
| TRANSFERRING | | ▶ | DATA TRANSFER FROM SPOOL HAS STARTED |
| TRANSFERRED | | ◇ | DATA TRANSFER FROM SPOOL HAS ENDED (INCLUDING "RETAIN DOCUMENT AFTER PRINTING" OPTION) |
| PRINTING : FAXING | | ▶ | JOB START IS RECEIVED FROM DEVICE |
| COMPLETED | | - | END-OF-JOB-NOTIFICATION IS RECEIVED |
| RESTARTING | | ▶ | PRINTING HAS BEEN RESTARTED FROM SPOOL BASED ON PRINTER PROPERTIES SETTING "RETAIN DOCUMENT AFTER PRINTING" |
| JOB ERROR | | ! | ERROR OCCURRED |
| UNKNOWN MODEL | | ? | MODEL NAME IS UNKNOWN |
| MODEL MISMATCH | | ≠ | MODEL NAMES DO NOT MATCH |
| STOPPED | | ‖ | PRINTING IS STOPPED TEMPORARILY FROM SPOOLER |
| DELETING | | × | DELETING |
| DELETED | | × | DELETION IS COMPLETED |
| NO STATUS (NO DISPLAY) | | | STATUS COULD NOT BE ACQUIRED BECAUSE STATUS ACQUISITION IS NOT SUPPORTED BY OS OR FOR OTHER REASONS |

PRINTER CONTROL METHOD, INFORMATION PROCESSING APPARATUS, PROGRAM, AND STORAGE MEDIUM

BACKGROUND OF THE INVENTION

1. Field of the Invention

The present invention relates to an information processing apparatus which manages various information about printers including their status and to a printer control method for the information processing apparatus as well as to a storage medium and a program.

2. Related Background Art

Recently, network equipment has come into common use, with a large number of personal computers (hereinafter abbreviated to PCs) and printers connected to networks. As a system for use in such an environment to print a document which has a large number of pages or of which a large number of copies are required, a system (distributed printing system) is known which spools a print job temporarily and outputs data for each page or each copy to a plurality of printers in order to reduce print time. For example, Japanese Patent Application Laid-Open No. 2001-290623 discloses a technology for detecting the latest operational status of each printer in the distributed printing system from a real printer driver 130, 140, or 150 of the each printer and updating the detected latest operational status of the each printer at predetermined intervals.

SUMMARY OF THE INVENTION

However, conventional technologies did not take a form in which device information about printers and the like in a distributed printing system is monitored collectively. Consequently, in order to manage information about the distributed printing system, the user is forced to carry out a complicated task of remembering the devices which compose the distributed printing system, selecting the devices in sequence, and obtaining information about the selected devices.

Moreover, only a single form of virtual printer is taken into consideration, and there is room for improvement in the way of managing devices and jobs in a printing environment where various types of virtual printer coexist.

The present invention has been made in view of the above problems. Its object is to provide a device management mechanism for managing printers easily in a printing system such as a distributed printing system which employs a plurality of printers. It provides a mechanism in a printer management method for managing status of a plurality of printers, wherein the mechanism comprises a recognition step of recognizing a selected virtual printer; an identification step of identifying member printers associated with the virtual printer recognized in the recognition step; and a display control step of displaying information about the member printers associated with the virtual printer and identified in the identification step.

BRIEF DESCRIPTION OF THE DRAWINGS

FIG. 13A is a diagram showing status icons of real printers;

FIG. 13B is a diagram showing status icons of virtual printers;

FIG. 18 is a diagram showing how a member printer is controlled in a virtual printer (group printer);

FIG. 19 is a diagram showing how various information is managed in a real printer (member printer);

FIG. 29 is a diagram showing how a member printer is controlled in a virtual printer (group printer);

FIG. 30 is a diagram showing how various information is managed in a real printer (member printer);

FIG. 31 is a diagram showing job status data (an intermediate file) in a virtual printer;

FIG. 32 is a diagram showing job data (PDL, derived job) in a real printer;

FIG. 36 is a diagram showing an example of job status icons which represent statuses of a job;

FIG. 37 is a diagram showing an example of job status icons which represent statuses of a job.

DESCRIPTION OF THE PREFERRED EMBODIMENTS

Preferred embodiments of the present invention will be described below.

(First Embodiment)

Figure 1:
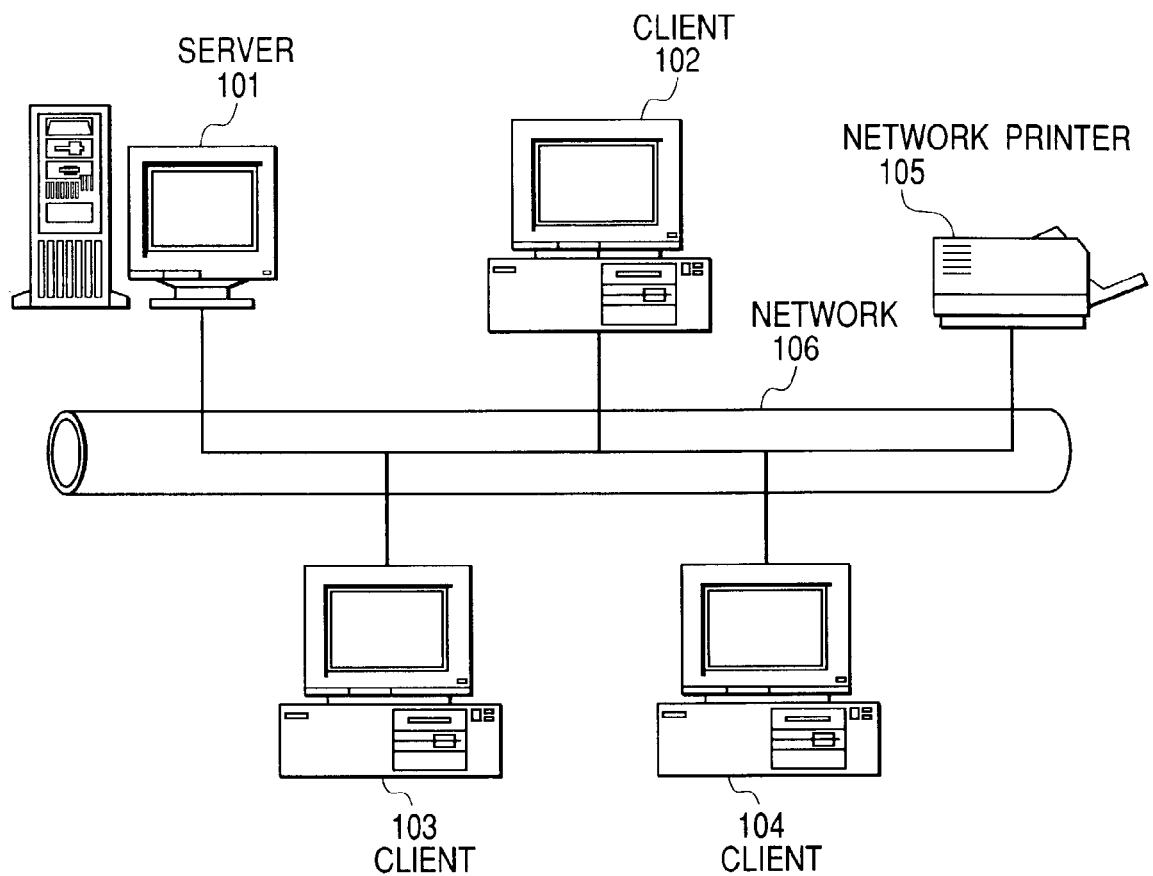
FIG. 1 is a block diagram illustrating a configuration of an information processing system to which the present invention can be applied.

FIG. 1 is a block diagram illustrating a configuration of an information processing system to which the present invention can be applied. It is assumed that one or more client computers are connected to this system.

In FIG. 1, reference numerals 102, 103, and 104 denote information processing apparatus which serve as client computers (clients), being connected to a network 106 via Ethernet (registered trademark) or similar network cables, capable of executing various programs including application programs, and equipped with a printer driver which has capabilities to convert print data into a printer language compatible with printers. Incidentally, it is assumed that the printer driver supports a plurality of printer drivers. Needless to say, printers include laser beam printers which employ electrophotography, ink jet printers which employ ink jet method which employ thermal transfer, and various other types of printers.

Reference numeral 101 denotes an information processing apparatuserving as a server according to this embodiment (hereinafter referred to as the print server). The print server is connected to the network 106 via a network cable. It accumulates files used on the network and monitors the usage of the network 106. The print server 101 manages a plurality of printers connected to the network 106.

In terms of configuration, the clients 102 to 104 and print server 101 are typical information processing apparatus. The client and print server store executable print control programs which work differently from each other.

The print server 101 is a typical information processing apparatus and can have the functions of the clients 102 to 104 as well.

The print server 101 according to this embodiment further comprises capabilities to store print jobs including print data and do printing according to print requests from the client computers 102, 103, and 104; receive job information without print data from the client computers 102, 103, and 104, manage the printing sequence of the client computers 102, 103, and 104, and allow the client whose turn comes to transmit a print job including print data; or acquire status of a network printer 105 and various information about print jobs and send them to the client computers 102, 103, and 104.

Reference numeral 105 denotes the network printer which is a print control apparatus. The network printer is connected to the network 106 via a network interface (not shown). It analyzes a print job, including print data, transmitted from the client computers 102, 103, and 104, converts it page by page into dot images, and print each page. Reference numeral 106 denotes the network, which is connected with the client computers 102, 103, and 104, the print server 101, the network printer 105, etc.

Figure 2:
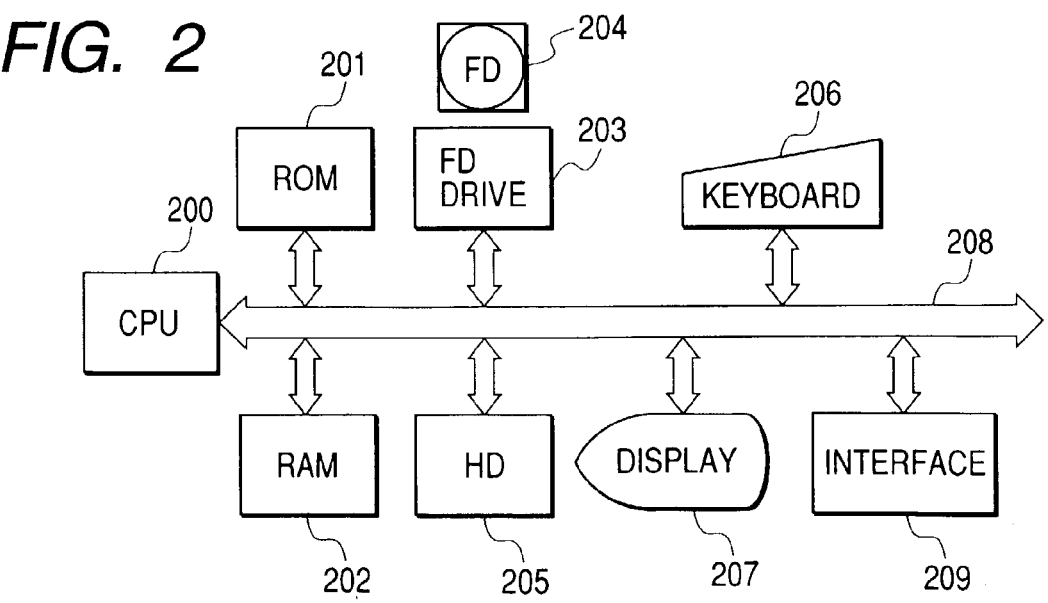
FIG. 2 is a block diagram illustrating a configuration of an information processing apparatus according to the present invention.

FIG. 2 is a block diagram illustrating a configuration of an information processing apparatus according to this embodiment. This configuration is the same as that of the client computers 102, 103, and 104, which are information processing apparatus, and is similar or equivalent to that of the print server 101. Thus, this block diagram will be used to illustrate both client and server.

In FIG. 2, reference numeral 200 denotes a CPU, which is a control means of the information processing apparatus. The CPU 200 performs control in such a way as to execute application programs, printer driver programs, an OS, a network printer control program according to the present invention, etc. which are stored on a hard disk (HD) 205 and temporarily store information needed to execute the programs, files, etc. in a RAM 202.

Reference numeral 201 denotes a ROM, a storage means which stores programs including a basic I/O program as well as various data such as font data used for document processing and template data. Reference numeral 202 denotes the RAM, a temporary storage means which functions as a main memory, work area, and the like for the CPU 200.

Reference numeral 203 denotes a floppy (registered trademark) disk (FD) drive which serves as a means for reading a storage medium. Programs and the like stored on an FD 204 which serves as a storage medium are loaded to this computer system through the FD drive 203 as described later with reference to FIG. 5. Incidentally, the storage medium is not limited to the FD, but it may be a CD-ROM, CD-R, CD-RW, PC card, DVD, IC memory card, MO, memory stick, or the like.

Reference numeral 204 denotes the floppy disk (FD) which is a storage medium containing computer-readable programs.

Reference numeral 205 denotes the hard disk (HD), an external storage means which functions as a large-capacity memory and stores the application programs, printer driver programs, OS, network printer control program, and related programs. Furthermore, it holds a spooler which is a spooling means. The spooling means here refers to a client spooler in the case of the client, and a server spooler in the case of the print server. On the print server, the external storage means also stores job information received from the client and a table generated for sequence control.

Reference numeral 206 denotes a keyboard, a user input means which allows device control commands or other commands to be entered into the client computer by a user and into the print server by an operator or administrator.

Reference numeral 207 denotes a display, a display means which displays the commands entered on the keyboard 206, status of printers, etc.

Reference numeral 208 denotes a system bus which manages flows of data in the computer which may be a client or print server.

Reference numeral 209 denotes an interface, an input/output means through which data is exchanged with external devices.

Figure 3:
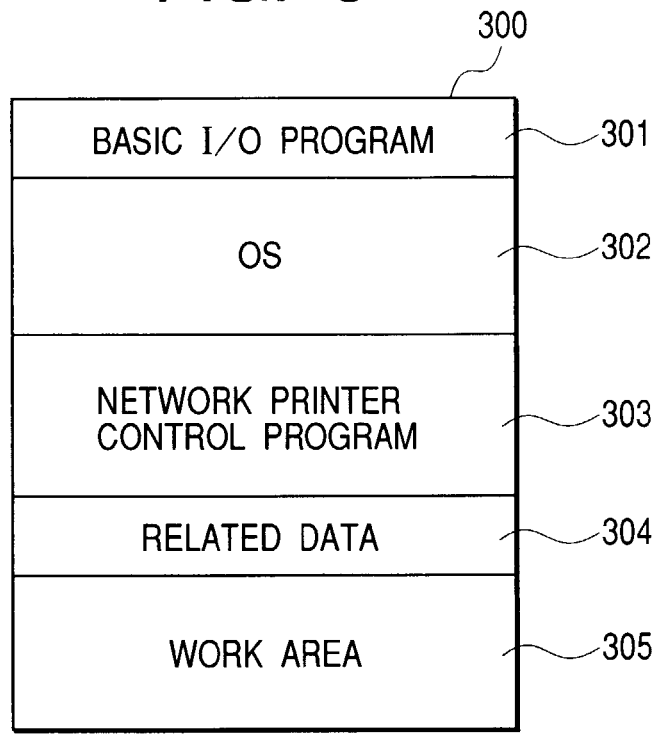
FIG. 3 is a diagram showing an exemplary memory map of the RAM 202 shown in FIG. 2.

FIG. 3 is a diagram showing an exemplary memory map of the RAM 202 shown in FIG. 2. It shows a state which appears when the network printer control program described above is made executable after being loaded from the FD 204 to the RAM 202.

According to this embodiment, the network printer control program and related data are loaded directly from the FD 204 into the RAM 202 for execution. Alternatively, the network printer control program may be preinstalled on the HD 205 and loaded into the RAM 202 from the HD 205 each time it is run from the FD 204.

Besides, instead of the FD, the network printer control program may be stored on another medium such as a CD-ROM, CD-R, PC card, DVD, IC memory card. Furthermore, it is also possible to store the network printer control program on the ROM 201, configure it as part of a memory map, and execute it directly by the CPU 200.

Also, it is possible to substitute hardware devices with software which implements functions equivalent to those of the above devices.

Besides, the network printer control program may be referred to simply as a print control program. The print control program on the client includes programs for giving instructions to change the printer which will handle a print job or change a printing sequence while the print control program on the print server includes programs for controlling the sequence of print jobs or delivering a notification about an end of a print job or a request to change a printer. Also, the print control program according to the present invention may be divided into a module to be installed on the client and a module to be installed on the print server or may be implemented as a single print control program which functions as a program for the client or program for the print server depending on the execution environment. Alternatively, it is possible to install a client module and a server module on a single computer and operate them simultaneously or in a manner simulating parallel operation on a time-shared basis.

Reference numeral 301 denotes an area for the basic I/O program, which has functions including the IPL (Initial Program Loading) function of reading the OS into the RAM 202 from the HD 205 and starting it when the control apparatus is turned on.

Reference numeral 302 denotes the operating system (OS), 303 denotes the network printer control program which is stored in an area secured on the RAM 202, and 304 denotes the related data which is stored in an area secured on the RAM 202. Reference numeral 305 denotes a work area where the CPU 200 runs the network printer control program.

Figure 4:
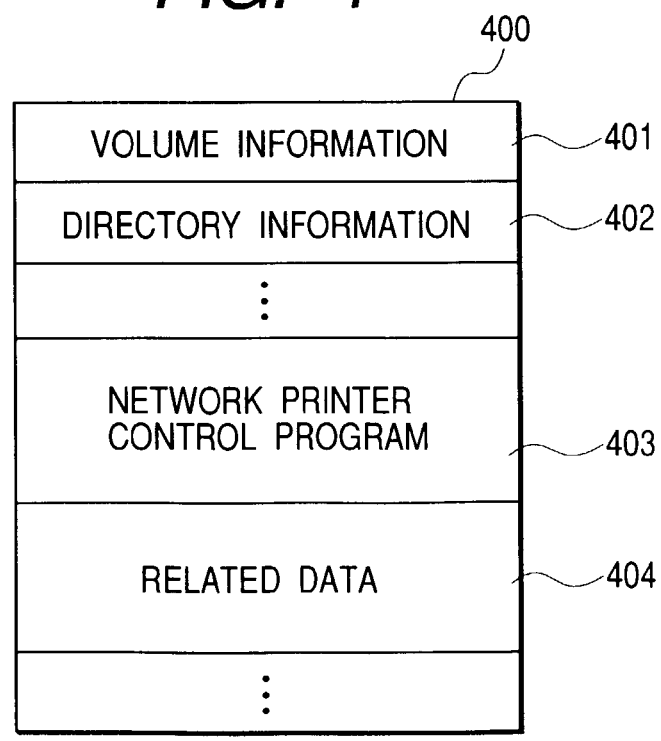
FIG. 4 is a diagram showing an exemplary memory map of the FD 204 shown in FIG. 2.

FIG. 4 is a diagram showing an exemplary memory map of the FD 204 shown in FIG. 2. In the figure, reference numeral 400 denotes the data content on the FD 204, reference numeral 401 denotes volume information which represents information about data, reference numeral 402 denotes directory information, reference numeral 403 denotes the network printer control program which is the print control program according to this embodiment, and reference numeral 404 denotes its related data. The network printer control program has been coded according to flowcharts described in this embodiment. It has similar configuration for both client and server.

Figure 5:
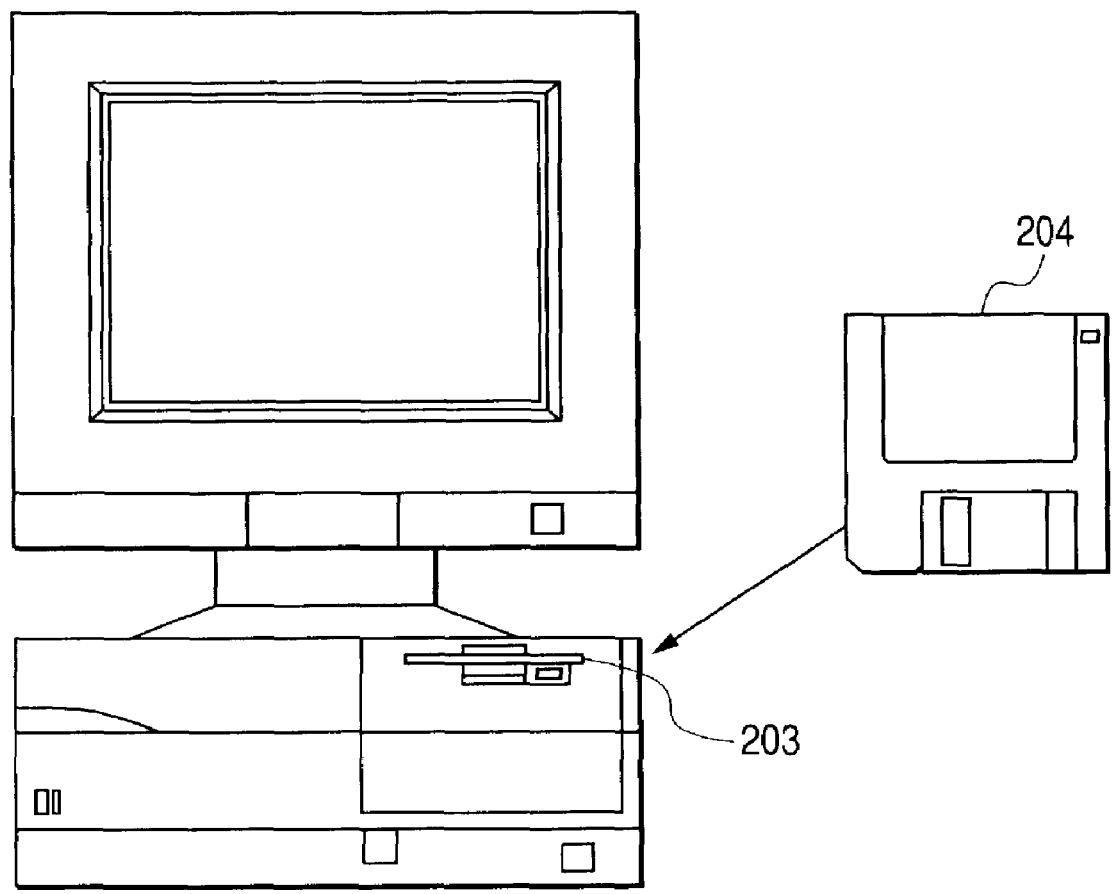
FIG. 5 is a diagram showing relationship between the FD drive 203 shown in FIG. 2 and the FD 204 inserted into it.

FIG. 5 is a diagram showing relationship between the FD drive 203 shown in FIG. 2 and the FD 204 inserted into it, wherein components are denoted by the same reference numerals as corresponding components in FIG. 2.

In FIG. 5, the FD 204 stores the network printer control program and related data described in this embodiment.

Next, description will be given of a print job control system which performs distributed (mentioned above), broadcast, or proxy printing processes using a plurality of printers.

Also, according to this embodiment, multiple printers are virtually organized into a single printer, referred to as a group printer, and the individual printers are referred to as member printers. Corresponding printer drivers are referred to as a group printer driver and member printer driver, respectively.

Figure 6:
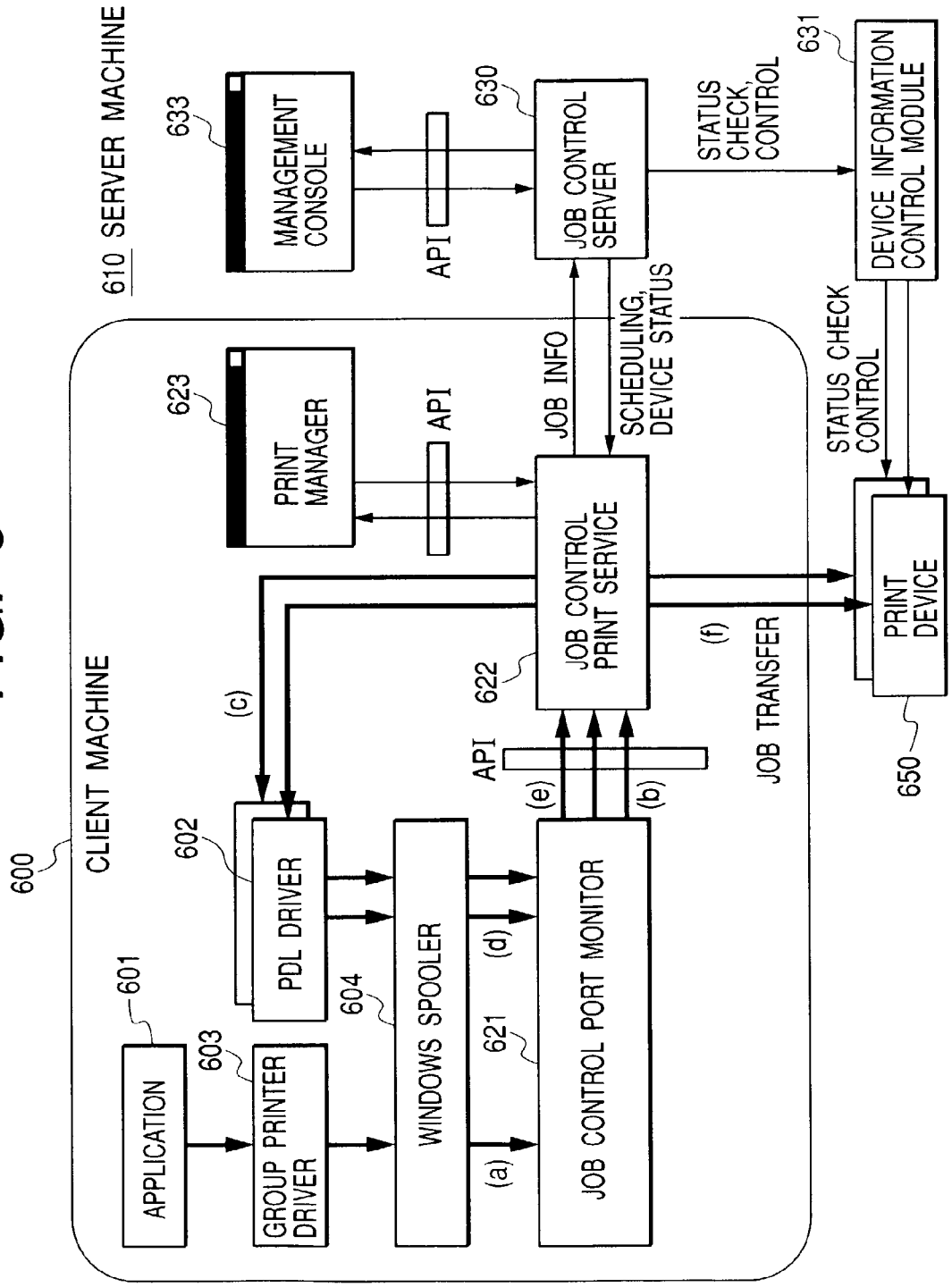
FIG. 6 is a diagram showing a module configuration for print control in the information processing apparatus according to the present invention.

FIG. 6 is a diagram showing how a print job issued by a general application such as Microsoft Word is processed by the print job control system in a client/server model of this system. In the figure, reference numeral 600 denotes a client machine on which the client module of the print job control system runs.

Normally, when a print instruction is issued, the application program generates a sequence of drawing commands, which are passed to the Windows spooler through the printer driver. Then, the Windows spooler passes print job data to a port monitor selected by the user so that the data will be transmitted to a printer device.

According to this embodiment, the user specifies a port monitor 621 for the print job control system (hereinafter abbreviated to the job control port monitor in this embodiment) in advance and directs printing. The application program 601 generates a sequence of drawing commands. Upon receiving the drawing commands, a group printer driver 603 generates a general print file and transmits it as print job data to the job control port monitor 621 instead of transmitting it to a port monitor which transmits print job data to printer devices. The job control port monitor 621 transmits the print job data to print service 622 for the print job control system (hereinafter abbreviated to the Job Control Print Service in this embodiment) instead of transmitting it to a printer device 650. The Job Control Print Service 622 has capabilities to manage status of jobs/devices managed by a job control server 630. Furthermore, if a device and client PC operate in a peer-to-peer environment, the Job Control Print Service 622 has capabilities to give predetermined commands to the device as well as to manage information such as device status and job status reported by the device. These are equivalent to capabilities to manage device information and job information for a plurality of printer devices 650.

A Print Manager 623 for the print job control system (hereinafter abbreviated to the Job Control Print Manager in this embodiment) is a program which provides a user interface (UI) that allows the user to check conditions of a print job in the Job Control Print Service 622 and handle a print job.

The Job Control Print Manager 623 transmits and receives information to/from the Job Control Print Service 622 via a software interface (API) of the Job Control Print Service 622 and has capabilities to acquire events constituted mainly of status information of external printer devices managed by the Job Control Print Service 622. Possible event notifications include error messages or warnings about low toner, communications problems between client and device, insufficient memory, and a filled paper output tray as well as notifications about return from an error condition to a normal condition.

The server 630 for the print job control system (hereinafter abbreviated to the job control server in this embodiment) centrally controls (schedules) the time when the Job Control Print Service 622 on individual clients 600 should transmit print job data to the printer device 650. Also, the print job control system server 630 has capabilities to monitor power control status, problem information (paper jam), and other status during printing carried out by devices (printers) capable of communicating via a network and notify the Job Control Print Service 622 of events. Regarding monitoring of printer status changes, the Job Control Print Service 622 can obtain status change notifications (events) directly from printer devices.

A management console 633 for the print job control system (hereinafter abbreviated to the job control management console) can monitor the entire print job control system by exchanging information and instructions with the job control server 630 via an API used for access by software owned by the job control server 630.

The job control server 630 communicates with the printer devices 650 using a Device Information Control module 631. It obtains and handles information about print jobs and operating status of each printer. The obtained information can be passed to the Job Control Print Service 622 on the side of the client 600.

Next, description will be given of printing carried out from the group printer driver 603 according to this embodiment.

The group printer driver 603 converts a sequence of drawing commands generated by an application program into a general print file in an intermediate format which is independent of the type of printer device. Configuration of the general print file will be described later.

The general print file is led from the Windows spooler 604 to the Job Control Print Service 622 (b) via the job control port monitor 621 (a) as described above. The Job Control Print Service 622 generates drawing commands (c) based on the general print file according to the type of job control performed on the print job, and then a PDL driver 602 compiles the drawing commands into a PDL file interpretable by the printer device 650. FIG. 6 shows an example in which the Job Control Print Service 622 divides the print job into two member jobs, which are indicated by two arrows (c). The PDL file generated by the PDL driver 602 is passed again to the Job Control Print Service 622 (e) via the Windows spooler 604 and job control port monitor 621 (d). The Job Control Print Service 622 transmits print job data in PDL to the printer device 650 (f) according to instructions from the job control server 630.

According to a print instruction contained in a general print file, the Job Control Print Service 622 divides the general print file logically into a plurality of print jobs and transmits them to different printer devices, or retransmits print job data once transmitted, to a different printer device. Paths used for these print job data are indicated by (c), (d), (e), and (f) in FIG. 6.

Application software which creates a general print file and input it directly as a print job differs from a general application in the way how information is passed to the group printer driver 603 as well as in specific processes carried out by the group printer driver 603. As described above, when passing drawing information to the group printer driver 603, a general application calls a Windows GDI function, as is the case with a typical printer driver, and the group printer driver 603 generates a general print file in response. On the other hand, an application which creates a general print file directly supplies the general print file it already possesses to the group printer driver 603. Then, the group printer driver 603 transmits the print instruction contained in the general print file to the Windows spooler 604 after rewriting it, as required, according to a predetermined print method.

Figure 8:
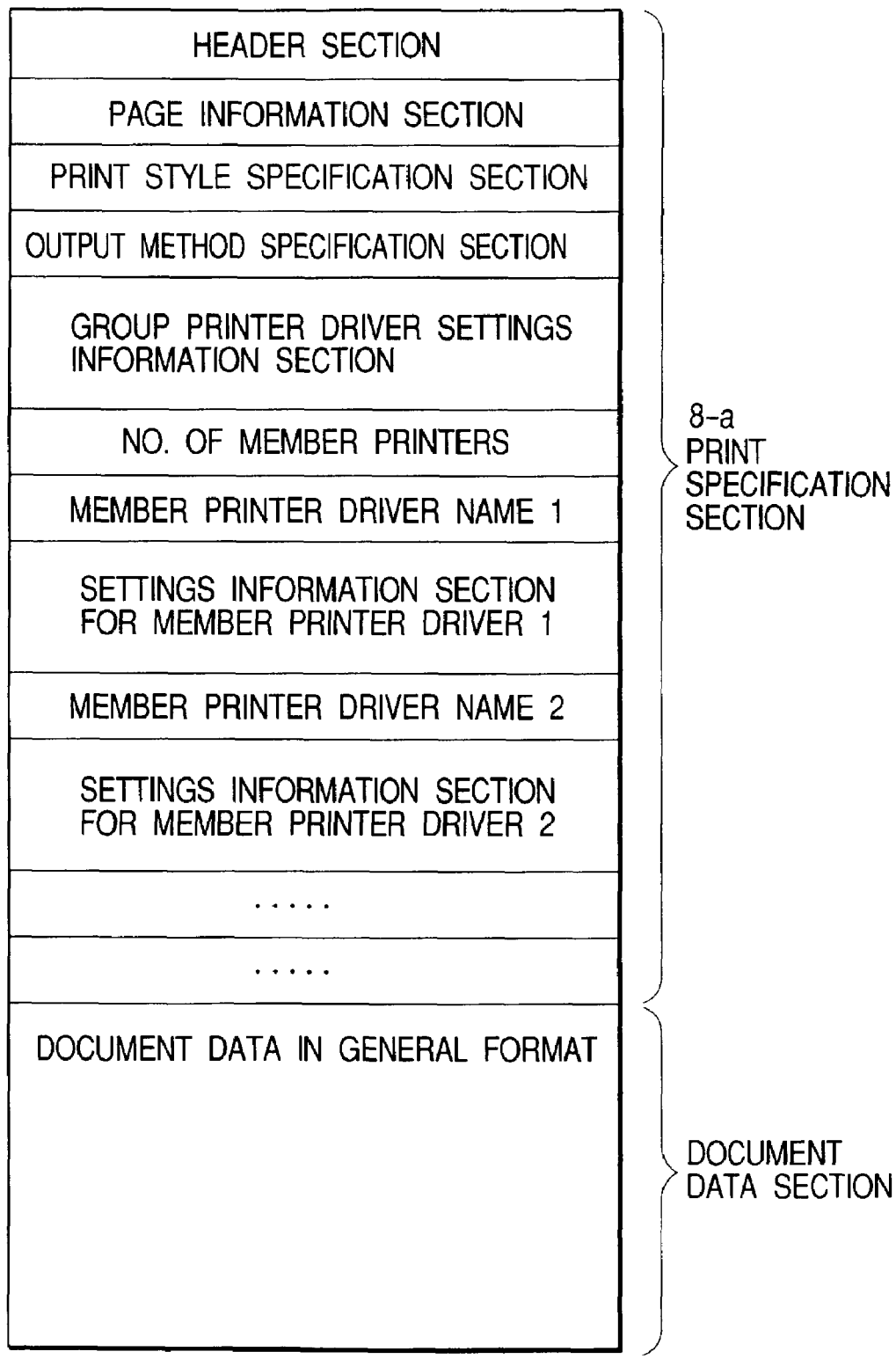
FIG. 8 is a diagram showing a structure of a general print file.

FIG. 8 is a diagram showing an exemplary structure of a general print file;

The general print file used in this embodiment consists of a print specification section 8-*a* and document data section 8-*b*. The print specification section describes document information and print instructions. Document data is obtained by converting application data into data in a general format independent of printer languages.

The print specification section consists of a header section, a page information section, a print style specification section, an output method specification section, a group printer driver settings information section, the number of member printers, member printer driver name sections, and settings information sections for member printer drivers, etc.

The header section contains version identification information, file information, and other information about the file.

The page information section contains the number of pages and size of each page for the document data contained in the document data section 8-*b*.

The print style specification section contains information about an output style, including information about a print page range and print copies, layout information about the document data (such as N-up printing or bound printing), staple specification or punch specification, etc.

The output method specification section contains information about an output method such as distributed printing, color/monochrome distributed printing, proxy printing, and broadcast printing.

The group printer driver settings information section contains settings information about a group printer driver UI described later.

The number of member printers contains the number of the member printers associated with the group printer driver.

The member printer driver name sections contain printer driver names for member printers.

The settings information sections for member printer drivers contain, for example, DEVMODE information as settings information for a member printer driver UI.

There are as many member printer driver name sections and settings information sections for member printer drivers as the number contained in "the number of member printers" section.

When generating a general print file, the group printer driver 603 described above with reference to FIG. 6 records settings specified on the group printer driver GUI in the print specification section 8-*a*. Furthermore, the group printer driver 603 converts data obtained by using the GDI into general data and records it as document data in the document data section of the general print file.

Figure 7:
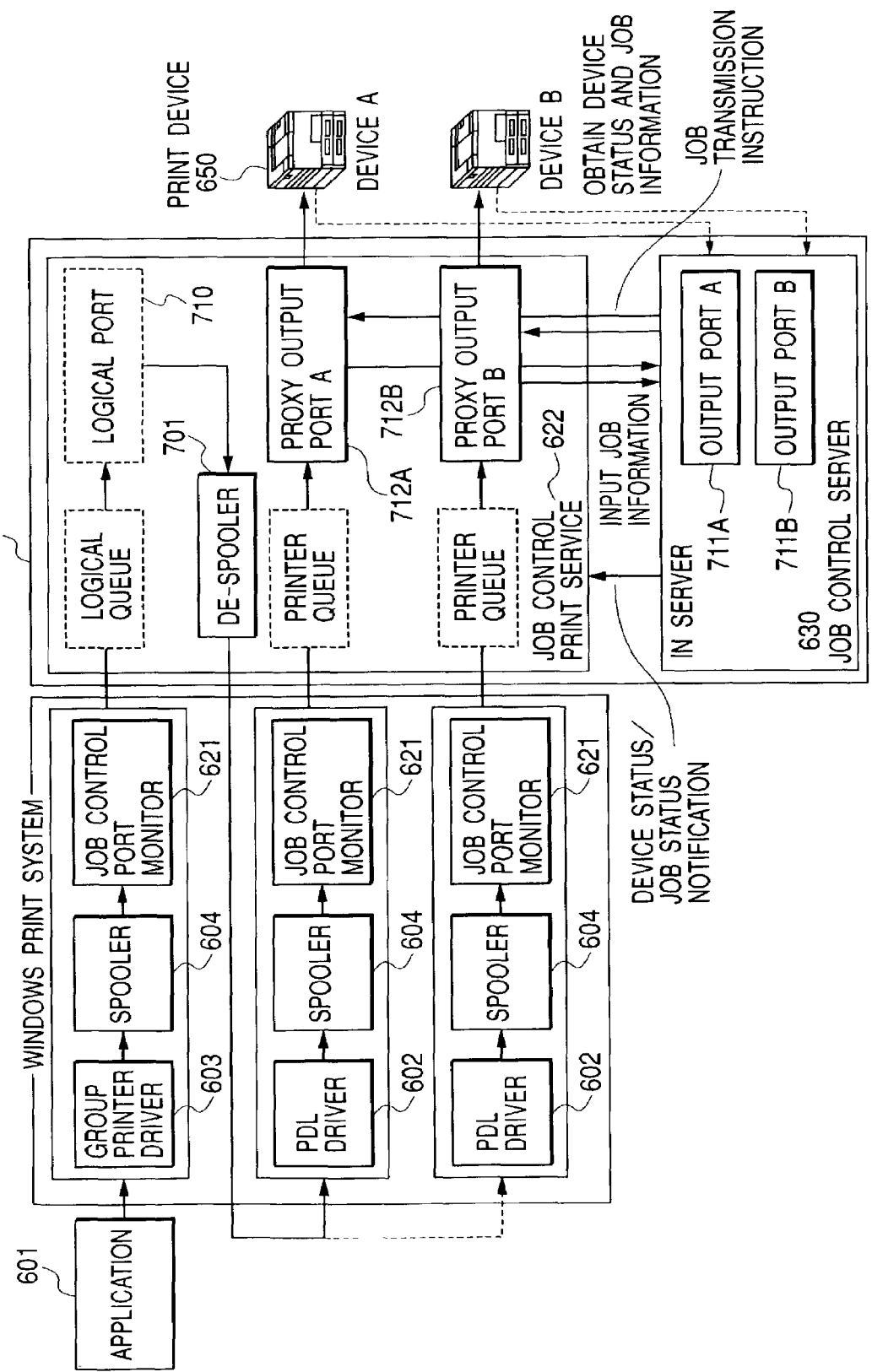
FIG. 7 is a diagram showing an exemplary data structure of job information managed by a print server

Next, processing of a print job between the Windows Printing System and the print job control system will be outlined in more detail with reference to FIG. 7.

FIG. 7 shows a scope of the print job control system 700 which straddles physical machines on which a server/client control program operates. Output ports 711 managed by the server is associated with proxy output ports 712 of the clients' Job Control Print Service 622 and each output port centrally manages all the proxy output ports of the clients associated with it. According to this embodiment, actual print job data is held at the proxy output port 712. The job control server 630 does not transmit the print job data itself, but instructs the Job Control Print Service 622 to transmits the print job. According to the instruction, the Job Control Print Service 622 transmits the print job data to the device 650.

Next, description will be given of processes carried out by the print job control system 700 for value-added printing, such as proxy printing, distributed printing, and broadcast printing.

When the print job control system 700 carries out value-added printing, such as proxy printing, distributed printing, or broadcast printing, the user or application program 601 must issue a print job to the printers to which the group printer driver 603 is assigned, as described above. The Job Control Print Service 622 receives the job data processed by the group printer driver 603, via the job control port monitor 621 as a general print file. Alternatively, a general print file may be created (constructed) as follows: the group printer driver 603 generates general print data, sources for a general print file, and the Job Control Print Service 622 integrates the general print data into a general print file.

The Job Control Print Service 622 receives the job and instructs other printers to which a PDL driver has been assigned to carry out printing by issuing a job (member job) to them via a Despooler 701.

The Despooler 701 interprets the print specification section 8-*a* of the general print file described above with reference to FIG. 8, processes the document data contained in the document data section 8-*b* and converts it into Windows GDI, and issues a print instruction and print job to printer drivers. For example, if 2-up is specified in the print style specification section, the Despooler 701 lays out two pages of document data in a reduced form in a single sheet. In the case of distributed printing or broadcast printing, the Despooler 701 issues a job to the plurality of member printers specified in the print specification section 8-*a*. Regarding proxy printing, member jobs are issued according to prior settings in the case of Automatic Proxy or according to user operations in the case of Manual Proxy when proxy conditions are satisfied.

When issuing a job to member printers, the Despooler 701 needs to prepare a print instruction and DEVMODE for each member printer. In doing that, the Despooler 701 reflects entries of the print specification section 8-*a*, in DEVMODE of each member printer.

The client-side Job Control Print Service 622 receives each member job's PDL data rendered by the PDL driver 602, via the job control port monitor 621, delivers information about the received jobs to the server, and holds the job data temporarily at its own proxy output port 712. Then, it transmits the job data to the print device 650 after receiving a transmission instruction from the job control server 630.

Figure 9:
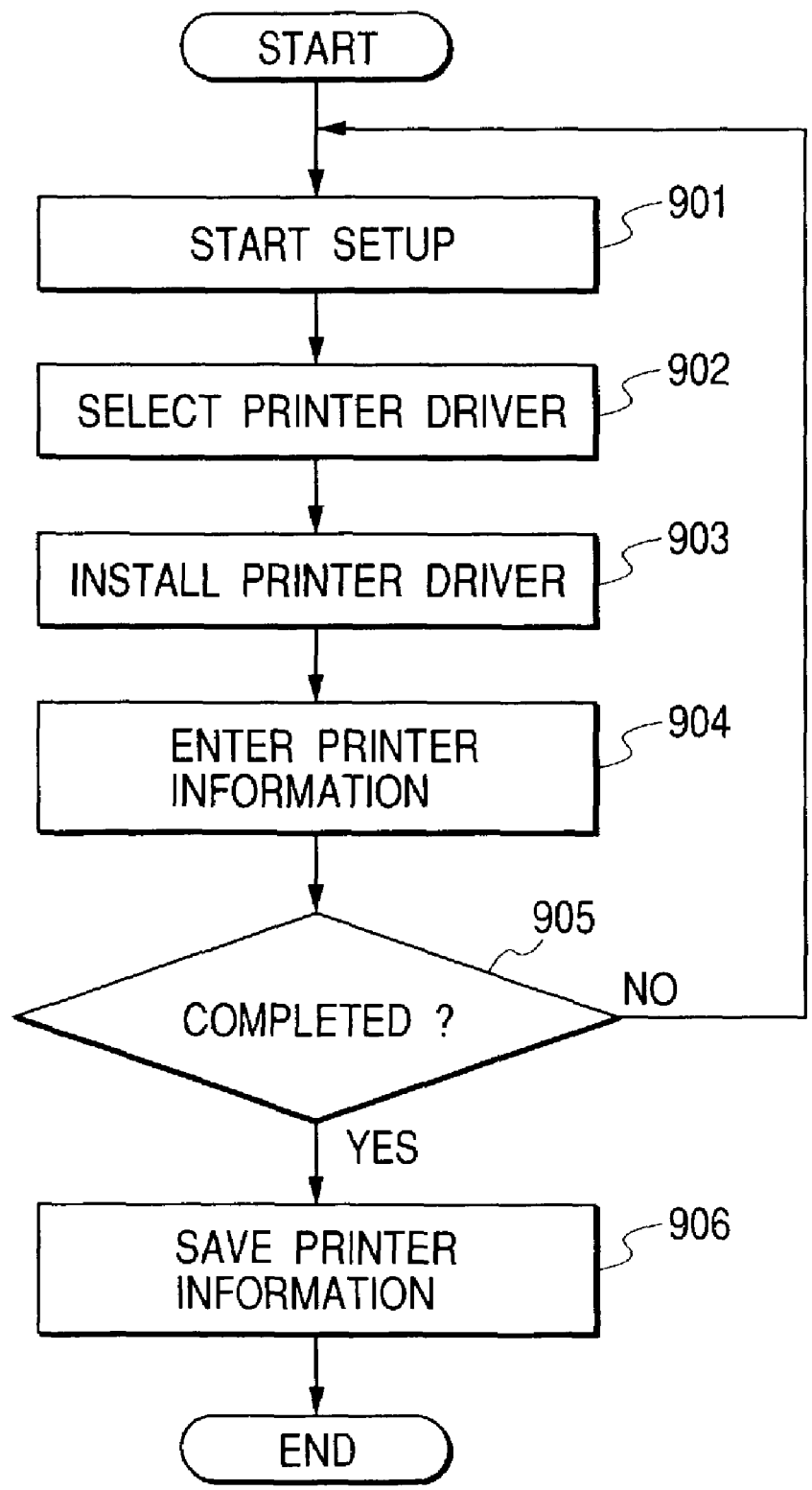
FIG. 9 is a flowchart showing how a member printer driver is registered and how printer attribute information is specified when this print control program is set up.

Next, FIG. 9 will be described. FIG. 9 shows how member printer drivers are registered when constructing an interface for a group printer driver to make print settings in FIGS. 10 and 12 described later.

First, in Step S901, setup is started after preparation.

In Step S902, a printer driver to be registered with a member printer is selected with a mouse or other pointing device for subsequent installation.

Next, in Step S903, the selected printer driver is installed and registered as a member printer driver.

Next, in Step S904, printer information corresponding to the installed printer driver is obtained. Printer information (device information) to be entered includes, for example, supported paper size such as A3, A4, or B5, whether duplex is available, and whether stapling is available as well as information about finishing functions such as whether punching is available and whether z-folding is available.

Regarding methods for obtaining printer information, the control program may acquire printer information acquired by the installed printer driver from the corresponding printer device via a predetermined network or set values entered on a keyboard or the like may be registered as printer information.

Next, in Step S905, it is judged whether installation of all relevant member printer drivers has been completed. If not, the processing returns to Step S902 and repeats the process of registering a selected printer driver as a member printer driver. If the installation has been completed, the processing goes to Step S906.

In Step S906, the set values in device attribute information obtained in Step S904 are stored and held, for example, in the system registry together with the names of the printer drivers. Through the processes shown in the flowchart of FIG. 9, a user interface such as the one shown in FIGS. 10 and 12 described later is constructed. For example, the device information indicated by reference numeral 1006 in FIG. 10 results when the information saved in Step S906 described above is displayed for corresponding member printers.

Figure 10:
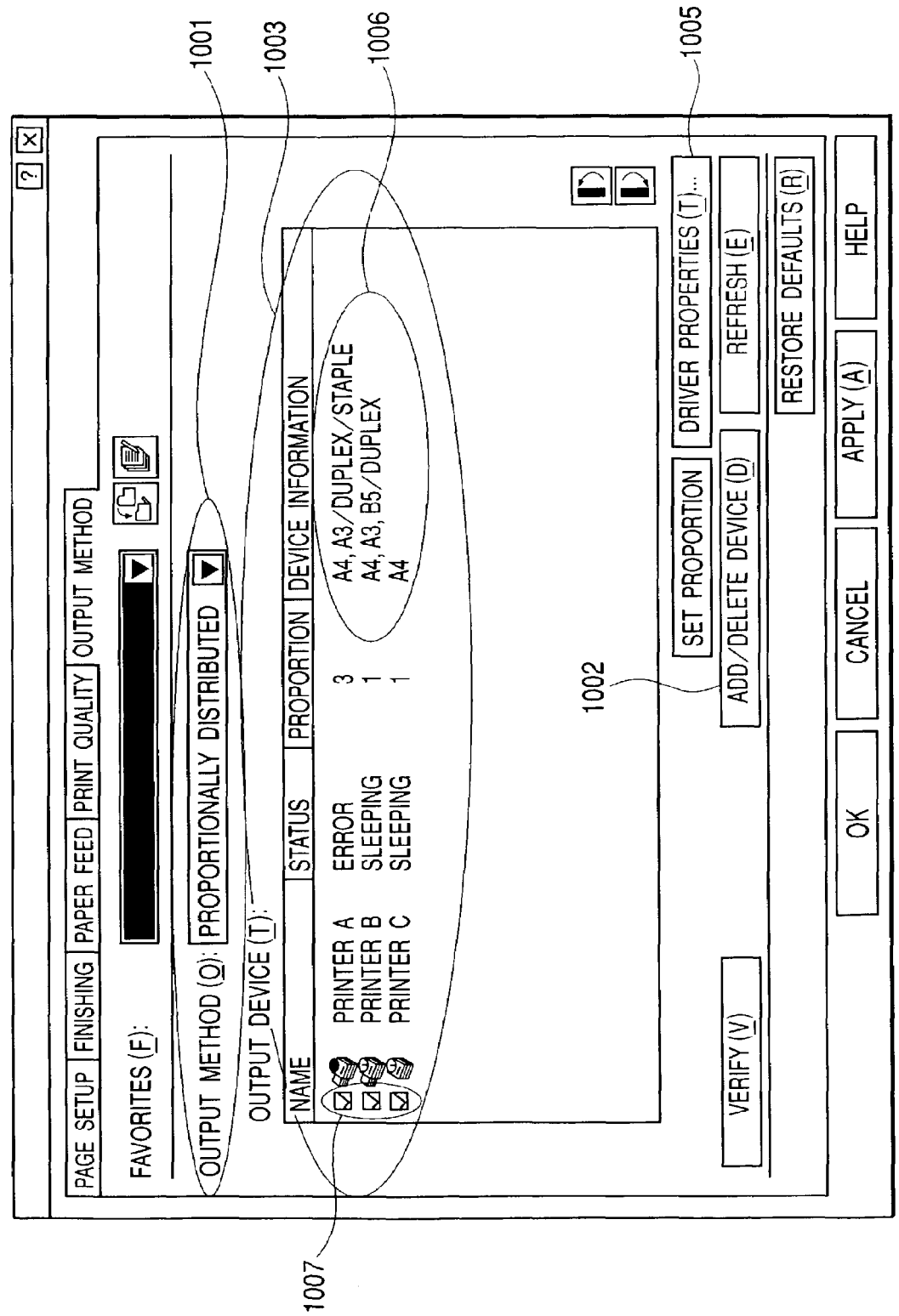
FIG. 10 is a diagram showing an example of a UI displayed when proportionally distributed printing is specified as an output method.

The user interface (group printer driver UI) according to this embodiment will be illustrated concretely with reference to FIG. 10.

In FIG. 10, reference numeral 1001 denotes a combo box used to select and specify an output method. Pointing to the combo box 1001 with a mouse or other pointing device brings up a list of output methods, allowing the user to select a predetermined output method.

Reference numeral 1002 denotes a button for opening a UI used to register member printer drivers in a group printer driver of a predetermined type. The UI opened here will be described later. The group printer driver of a predetermined type may be, for example, a group printer driver for proportional distribution (shown in FIG. 10), group printer driver for color/monochrome distributed processing (described later), group printer driver for automatic proxy, or group printer driver for broadcast printing.

Reference numeral 1003 in FIG. 10 denotes a list box which displays a list of registered member printer drivers after registration of member printers.

In this example, the UI displays various information about member printers together with the names of member printer drivers. The content of the displayed list changes according to the output method specified from a pull-down menu 1001. In other words, the composition of member printer drivers varies among output methods. This allows the user to call a member printer driver suitable for a given output method easily, eliminating the need to register a member printer driver each time the output method is changed.

Figure 11:
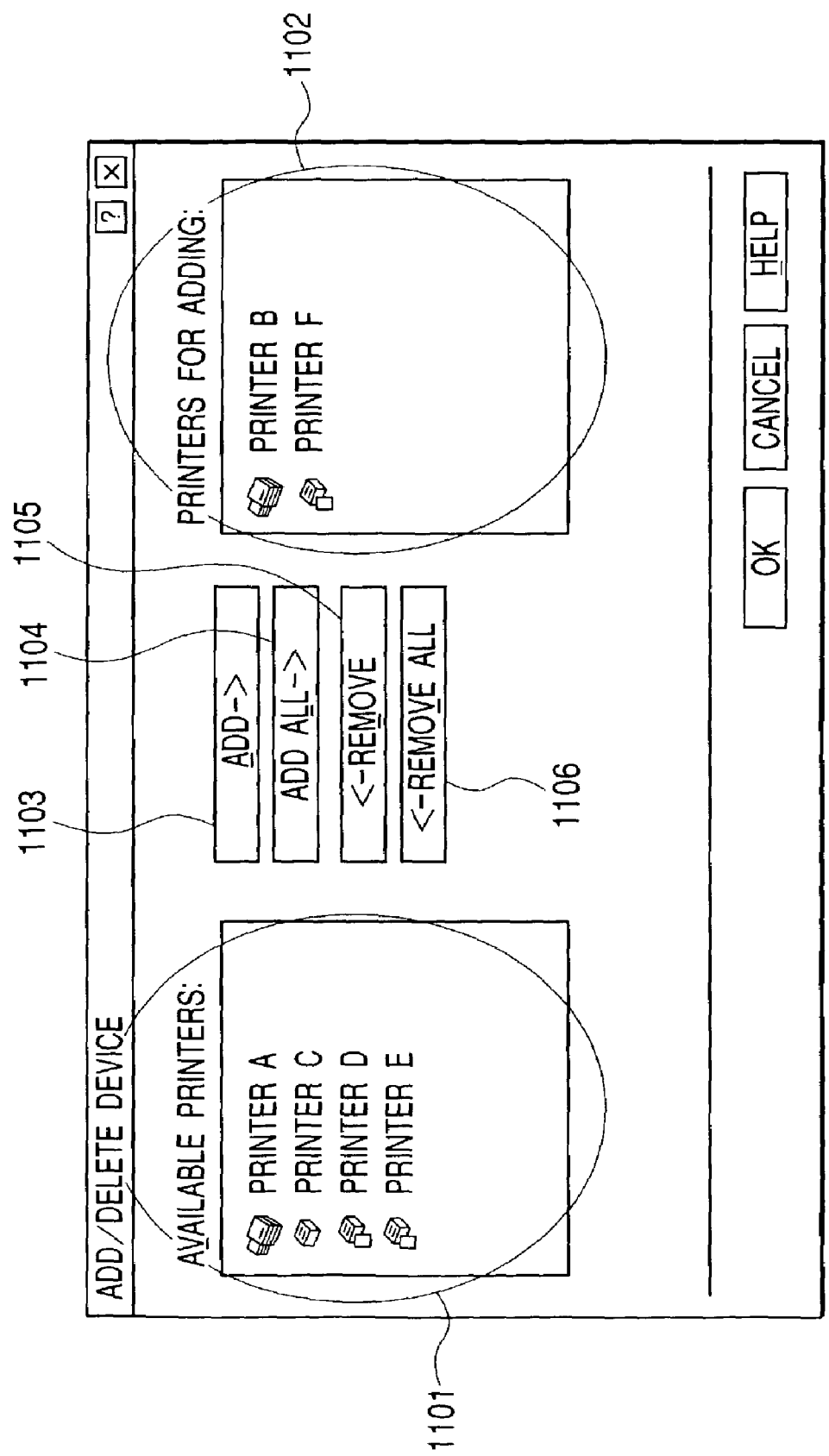
FIG. 11 is a diagram showing an example of a UI displayed which has capabilities to add/delete (register) printer drivers.

Reference numeral 1007 denotes check boxes used to exclude a member printer driver registered via a UI such as the one shown in FIG. 11 temporarily from the composition of printer drivers used for output or include it in the composition. When a check box is selected, the given member printer driver is used for printing and when a check box is deselected, the given member printer driver is not used for printing. In other words, the member printer drivers included in the choices of 1007 are those registered in a first registration process while the member printer drivers whose check box is marked are those selected in a second registration process to be used for actual printing.

In this way, the present invention allows member printer drivers to be registered through two stages: first registration and second registration. In ordinary distributed printing, member printer drivers specified for use in printing can be excluded temporarily. Conversely, when a failed printer is repaired, the use of the check box makes it possible to specify the corresponding member printer driver again to be started for actual printing. This is made possible by holding information about the member printers registered (first registration) for each output method and information about whether member printer drivers are selected for use via the check box separately in predetermined storage.

Furthermore, according to the present inventions, first registration and second registration (described above) can be used for each of a plurality of output methods. First registration and second registration are used separately for distributed printing as well as for broadcast printing, color/monochrome distributed printing, and proxy printing (described later).

Reference numeral 1006 denotes a display field for attribute information about each device. Attribute information about the device which corresponds to each member printer driver belonging to a group printer driver is displayed together with the name of the member printer driver under display control by the control program.

Next, registration and deletion of a member printer driver will be described with reference to FIG. 11.

FIG. 11 shows a UI which is brought up when this control program recognizes a signal resulting from a press of the "Add/Delete Device" button 1002 shown in FIG. 10 (described above).

In FIG. 11, reference numeral 1101 denotes a list box which displays a list of member printer drivers available for selection. The available member printer drivers are printer drivers which have been installed, with a port that can be handled by this system assigned, and whose existence can be recognized by this control program.

Reference numeral 1102 denotes a list box which lists selected member printer drivers. Buttons 1103, 1104, 1105, and 1106 allow member printers selected from the list of available member printers to be added or deleted.

If a signal resulting from a press of the button 1103 is recognized, the printer drivers currently selected in 1101 are added to a composition of member printer drivers.

If a signal resulting from a press of the button 1104 is recognized, all the printer drivers listed in 1101 are displayed as member printer drivers in 1102.

Reference numeral 1105 denotes a button used to remove member printer drivers, contrary to 1103 and 1104. If a signal resulting from a press of the button 1105 is recognized, the selected member printer drivers are removed from the composition of member printer drivers in 1102. Also, settings can be made via the user interface shown in FIG. 11 for each output method (distributed printing, proxy printing, etc.) and composition of member printer drivers can be changed in FIG. 11 as well as in FIG. 9.

Figure 12:
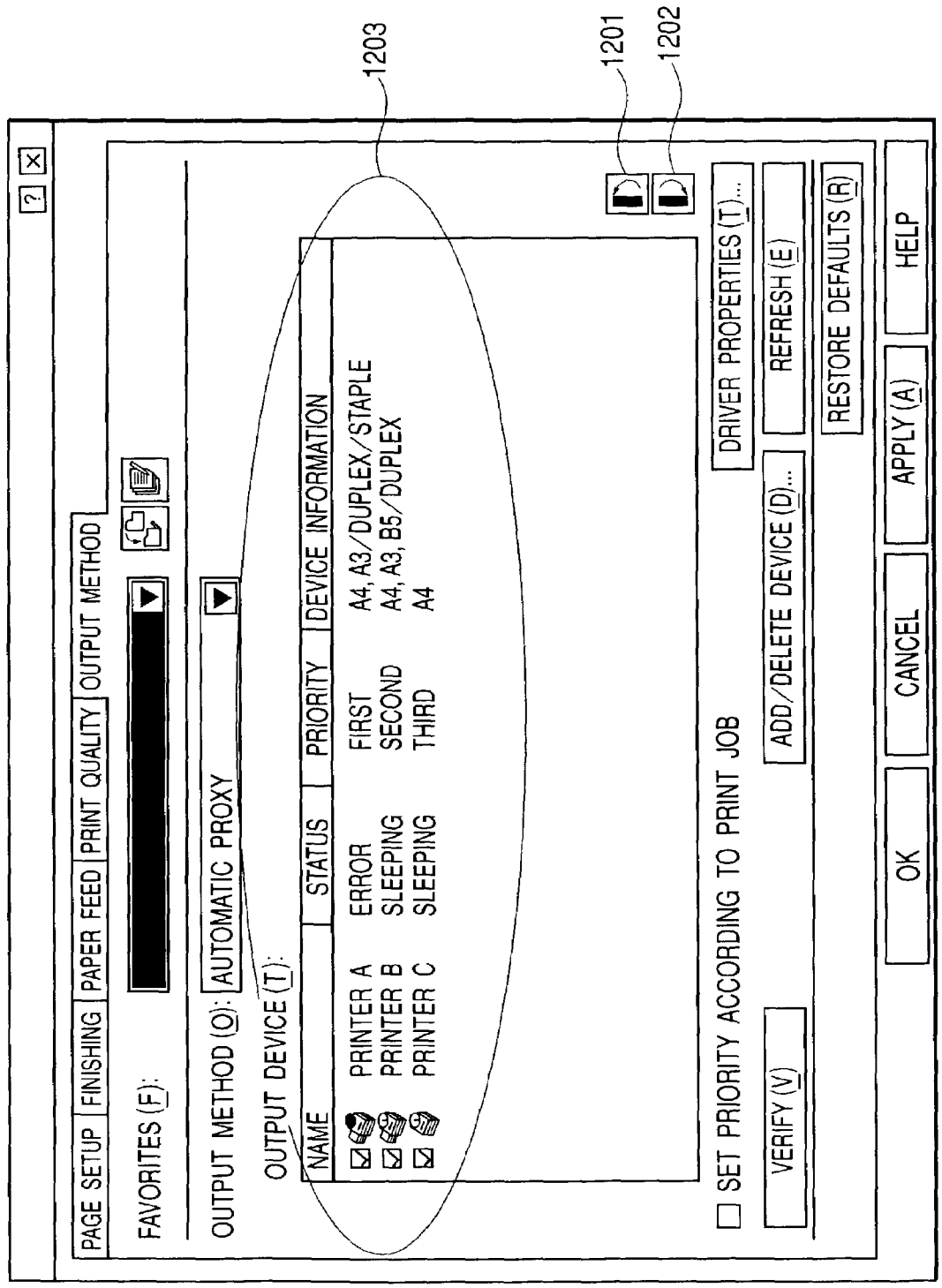
FIG. 12 is a diagram showing an example of a UI displayed when Automatic Proxy is specified as an output method.

FIG. 12 shows an example of a UI displayed when Automatic Proxy printing is specified as an output method from the selection list in FIG. 1001. It shows how the composition of registered member printer drivers changes according to the specified output method.

In the case of automatic proxy printing, a priority is assigned to each member printer driver. The member printer driver with the highest priority is used preferentially for printing. If the printer device currently intended to be used for printing becomes unable to print due to an out-of-toner or other error, the member printer driver with the second highest priority is used automatically for printing.

In this case, a plurality of member printer drivers can be registered, as is the case with proportional distribution (distributed printing). This control program is capable of assigning a priority to each member printer driver.

In FIG. 12, reference numerals 1201 and 1202 denote buttons for changing priorities of member printer drivers. In this UI example, the priorities of member printer coincide with the order in which the member printer drivers are listed in a member printer list 1203.

Therefore, by selecting a member printer driver from the list 1203 and moving it up one rank in the displayed member printer list with the button 1201, it is possible to raise its priority one rank.

Also, by moving the selected member printer driver one rank down in the displayed member printer list with the button 1202, it is possible to lower its priority.

Regarding the registration (Add/Delete) of member printer drivers described above, a UI similar to the one shown in FIG. 11 is displayed, allowing the user to add or delete member printers as explained in the second embodiment.

Next, description will be given of a mechanism for managing a plurality of printers in a system—such as the one described above—which handles a plurality of printers.

Figure 14:
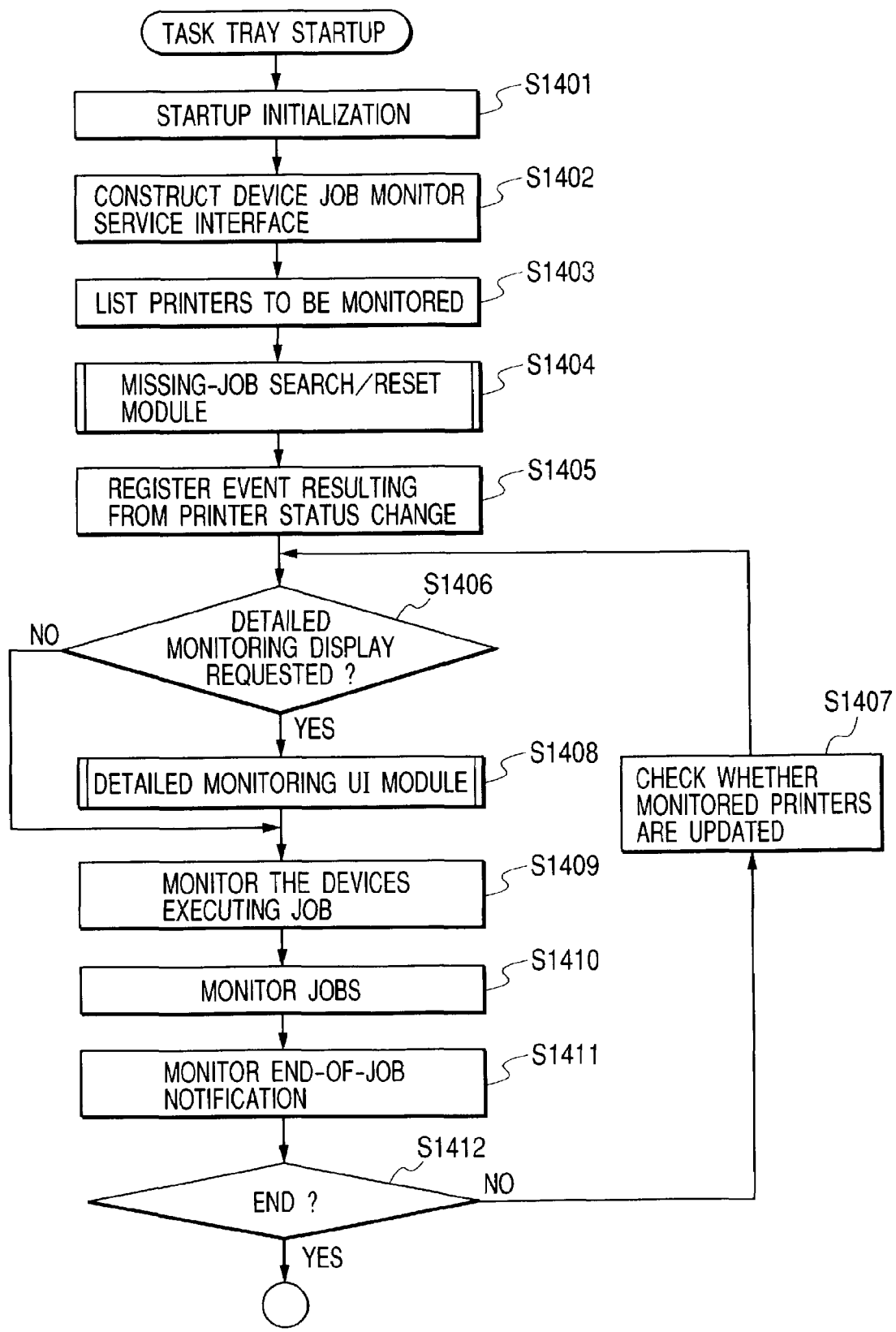
FIG. 14 is a task tray flowchart of status management control by Print Manager based on device monitoring by the print control program.

FIG. 14 shows control processes performed by the Print Manager 623 described with reference to FIG. 6. They are carried out as a CPU installed in an information processing apparatus reads program code out of a nonvolatile storage means such as a ROM or HD and executes it.

First, as the user gives a start instruction using a mouse, keyboard, or other pointing device, task tray is started up.

Then, in Step S1401, a startup initialization process in the task tray startup process is carried out.

In Step S1402, a device job monitor service interface is constructed. The device job monitor service interface is an interface to the Job Control Print Service 622 in FIG. 6 and is used by the Print Manager to acquire device status and print queue information managed by the Job Control Print Service module.

In Step S1403, the printers to be monitored are enumerated. This process of enumeration is carried out by the Print Manager 623 and involves acquiring management information about one or more printers from the Job Control Print Service 622 and grasping the acquired information. The information acquired from the Job Control Print Service 622 is managed in a format shown in FIGS. 18 or 19, for example.

Print information received by the Print Manager 623 from the Job Control Print Service 622 includes information about group printers (virtual printers) and member printers (real printers which operate actually).

In Step S1404, a Missing-Job Search & Reset module carries out an error/trouble recovery process such as reprinting for a job remaining after forced termination.

In Step S1405, the Print Manager 623 registers an event request with the Job Control Print Service 622, requesting the latter to report events which will result from changes in printer status. In practice, the Print Manager 623 is notified of changes in the status of communications-ready image forming devices managed by the Job Control Print Service 622 on the network. That is, in Step S1405, the Job Control Print Service 622 is requested to report changes in the status of image forming devices it manages. Of course, it is also possible to implement a configuration in which the Print Manager 623 requests event notifications directly from the job control server 630 or print device 650.

In Step S1406, it is judged whether detailed monitoring display is requested. For example, it is judged whether a detailed monitor start button generated in Step S1401 is pressed with a pointing device to give a start instruction.

If the answer in Step S1406 is Yes, the processing goes to Step S1408. If the answer is No, the processing goes to Step S1409.

In Step S1408, a Detailed Monitoring UI module runs processing, which will be described in detail later with reference to FIG. 15.

In Steps S1409 and S1410, the devices running jobs and the jobs themselves are monitored, respectively, and in Step S1411, end-of-job notifications are monitored.

In Step S1412, it is judged whether the running program is instructed to terminate. If the answer is Yes, the execution of the program is terminated. If the answer is No, the processing goes to Step S1407, where the printers being monitored are checked for updates, and then the processing returns to Step S1406. The update check on the monitored printers in Step S1407 involves, for example, managing the addition and deletion of member printers performed via user interfaces such as the one shown in FIG. 11.

Next, FIG. 15 will be described. FIG. 15 details the process of Step S1408 in the flowchart of FIG. 14.

In Step S1501, a startup initialization process is carried out. This process consists of various initialization processed needed to bring up, for example, a screen such as the one shown in FIG. 20 (described later).

Figure 20:
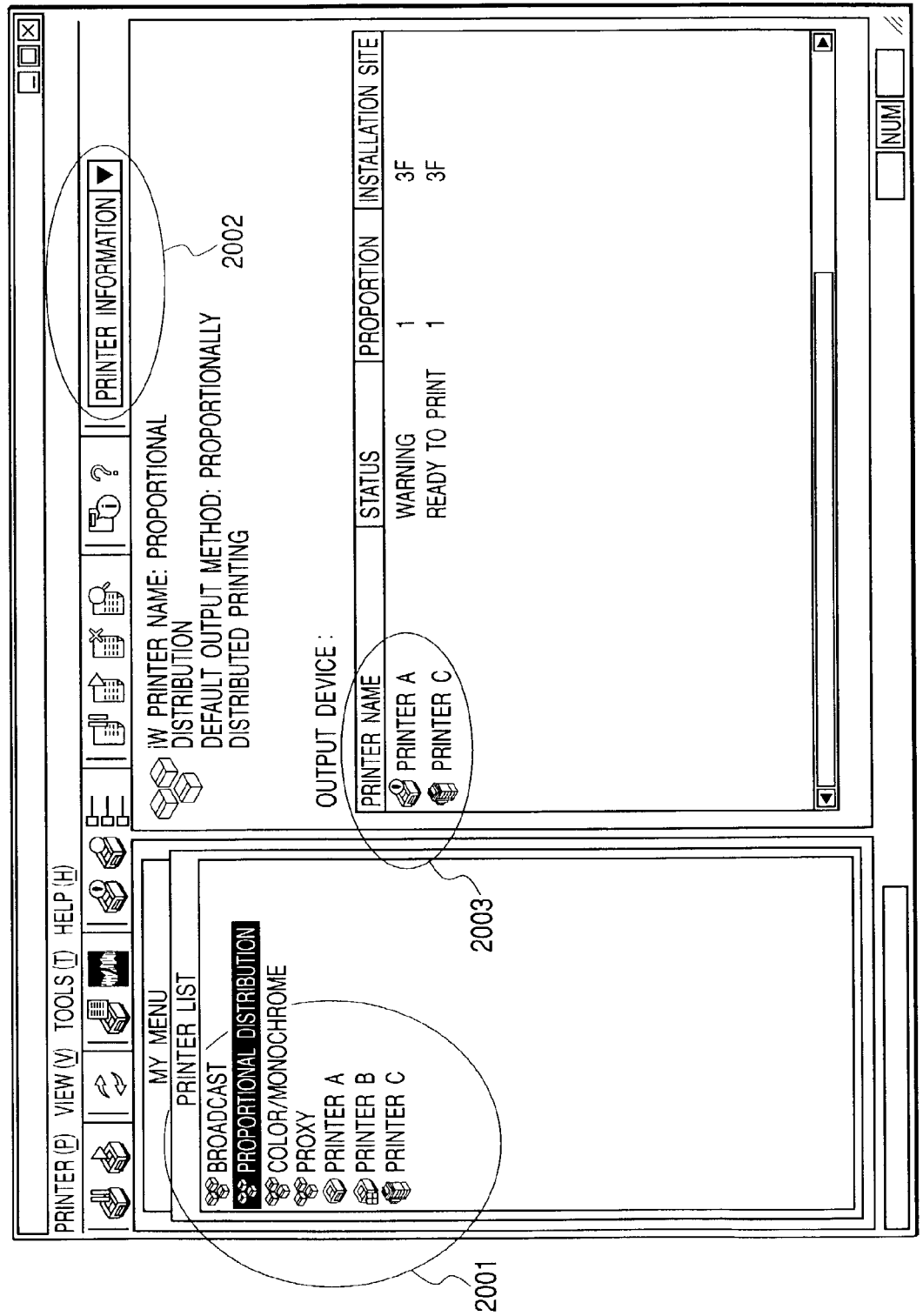
FIG. 20 is a diagram showing how a UI is displayed by Print Manager when a virtual printer (group printer) is selected.

In Step S1502, the printers to be monitored are enumerated. This process of enumeration includes acquiring information about the printers to be monitored (including both group printers (virtual printers) and member printers (real printers)) from the Job Control Print Service 622 and displaying the acquired printer list. For example, a printer list 2001 shown in the "Printer List" field in FIG. 20 is displayed as a result of the process in Step S1502. So are printer lists shown in the "Printer List" field in FIGS. 21, 22, 23, and 24. It is characteristic of these printer lists to contain both virtual printers and real printers. Each of the virtual printers and real printers in the lists accompanies an icon which represents the status of the given printer. Status icons of real printers are shown in FIG. 13A while status icons of virtual printers are shown in FIG. 13B. The status icons are changed with changes in the status of the printers (virtual printers/real printers). The status of a virtual printer can be determined, for example, by ORing the statuses of its member printers which correspond to the virtual printers, and then the icon which corresponds to the determined status is selected. In that case, if any of the member printers have "Spooler Stopped" status, the corresponding virtual printer will have "Spooler Stopped" status, and thus a "Spooler Stopped" status icon. Also, if any of the member printers have "Error" status, the corresponding virtual printer will have "Error" status, and thus an "Error" status icon.

In Step S1503, a menu displayed at startup is specified. More particularly, menus assigned to menu items brought up at program startup are displayed in such a way that they can be changed.

In Step S1504, it is judged whether a mode has been specified to be selected. If it is judged that "MY Menu" is specified, the processing goes to Step S1505. If it is judged that "Printer List Menu" is specified, the processing goes to Step S1506. Incidentally, the selection specification of a mode here means selection specification of a predetermined menu.

In Step S1506, it is judged what printer has been specified to be selected from among the printers enumerated in Step S1502 and the selected printer is recognized. If the recognized printer is a virtual printer, management information such as the one shown in FIG. 18 is read based on the virtual-printer name (identification information on the virtual printer) identified according to the selection specification and is used in the processes of steps in FIG. 16 (described later). For example, the information acquired in Step S1606 is identified based on information 1802 in FIG. 18, information 1803 and 1804, in the management information shown in FIG. 18, for identifying a member printer corresponding to a virtual printer is used in Step S1609, and detailed information about the member printer such as job/printer status and supplementary information 1805 and 1806 is used in the process of Step S1611.

Figure 16:
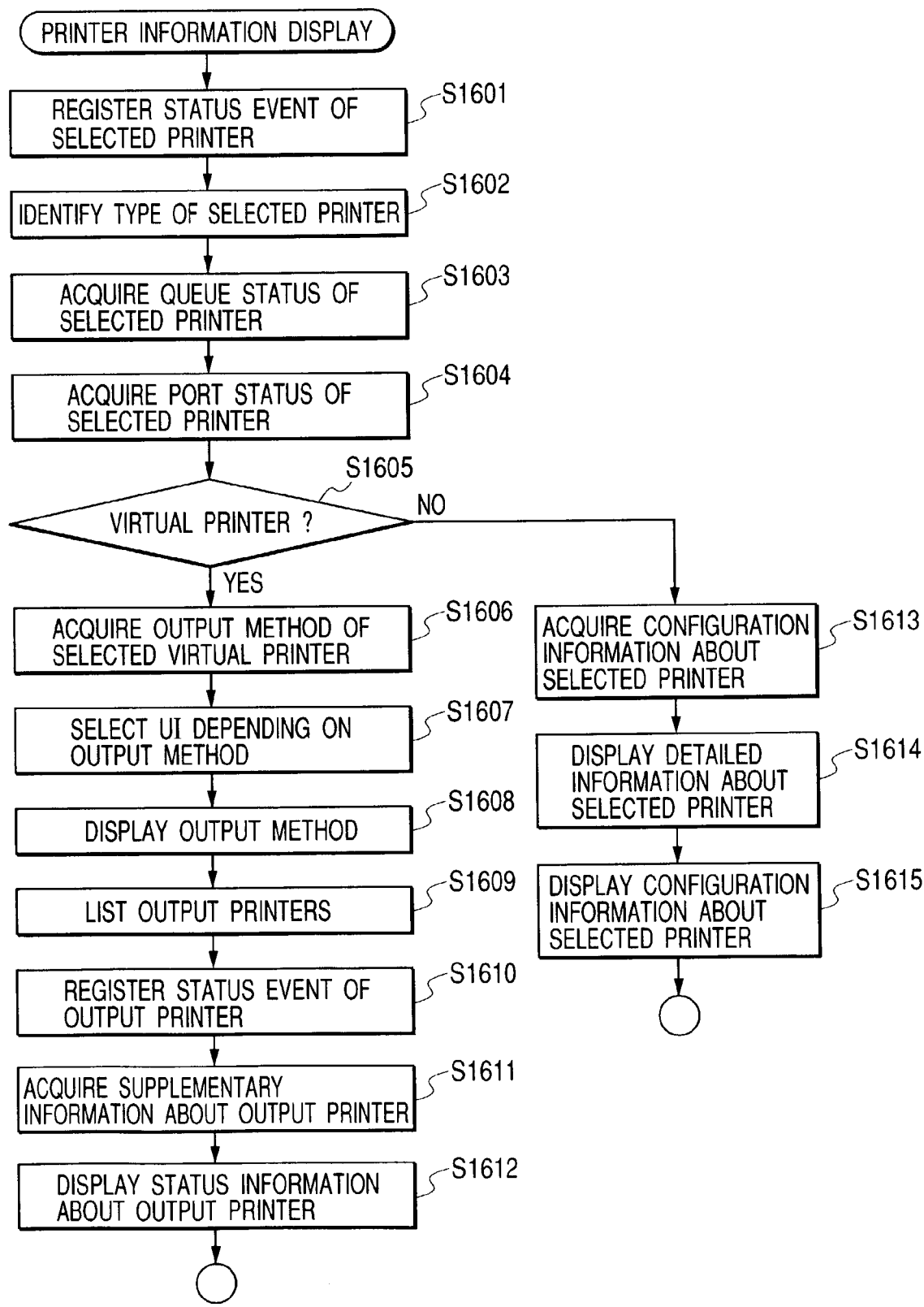
FIG. 16 is a flowchart of a printer manager control program when a virtual printer (group printer) or real printer (member printer) is selected.

On the other hand, management information shown in FIG. 19 is used to identify detailed information about a member printer (real printer) in Steps S1613 to S1615 shown in FIG. 16. For example, detailed status information about the real printer is stored in 1903.

In Step S1507, it is judged what type of mode is currently selected. Then, the display format of the information about the printer recognized as currently selected in Step S1506 is varied according to the selected mode type. A mode is selected here, for example, by being pointed to in a selection field 2002 in FIG. 20.

If it is judged in Step S1507 that "Printer Information" mode is selected, the processing goes to Step S1508; if it is judged that "Job List" is selected, the processing goes to Step S1509; and if it is judged that "Output Settings" is selected, the processing goes to Step S1510. In Step S1510, printer setup information (paper size, default resolution, etc.) selected in Step S1506 is displayed. Incidentally, detailed description of Step S1508 will be provided later with reference to FIG. 16.

Figure 15:
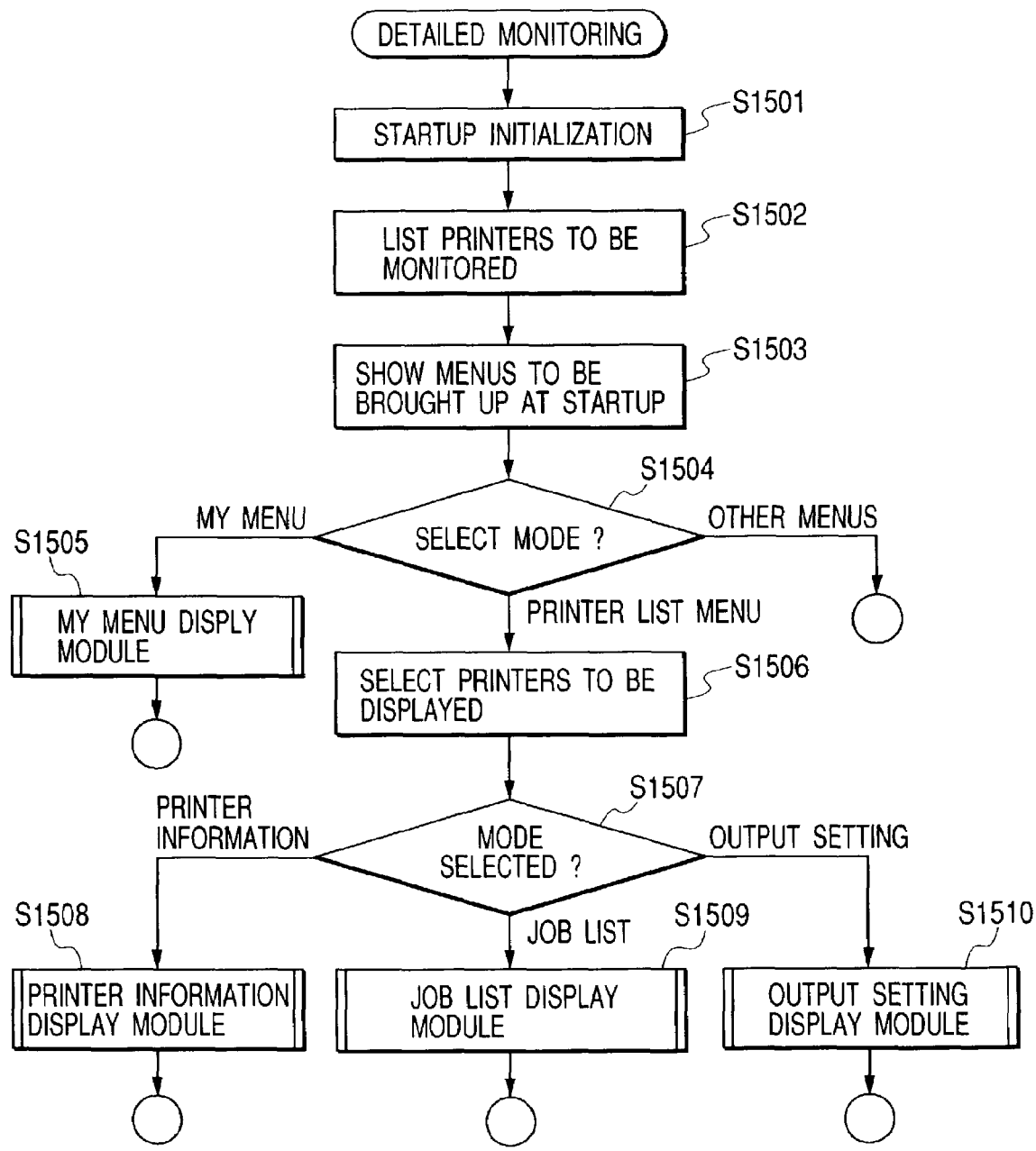
FIG. 15 is a control flowchart of detailed monitoring.

In this way, through the processes in the flowchart of FIG. 15, it is possible to display information about one or more predetermined printers (including virtual printers and real printers) selected from among the to be monitored printer(s) enumerated in Step S1502, by switching among various information, Printer Information, Job List, Output Settings, etc., according to the selected mode.

In Step S1506, although a mixture of group printers (virtual printers) and real printers (member printers) is listed, the user can select a printer without being aware of whether it is a virtual printer or real printer and obtain optimum printer information, job list information, or output settings information depending on what mode is selected.

Next, FIG. 16 will be described. FIG. 16 is a flowchart which details the process of Step S1508 in FIG. 15 described above.

First, in Step S1601, status events of the selected printer are registered. Specifically, status changes of the printer selected in Step S1506 of FIG. 15 are requested to be reported as events. In practice, the Print Manager 623 in FIG. 6 may request the Job Control Print Service 622 to notify it of the events.

Then, in Step S1602, an initialization process is carried out to obtain different information depending on the printer type recognized in Step S1601: whether it is a group printer (virtual printer) or member printer (real printer) or whether is an ink jet printer, laser beam printer, or network-enabled digital multifunction device.

In Steps S1603 and S1604, queue information and port information for the printer selected in Step S1606 are acquired from the Job Control Print Service 622. The Job Control Print Service 622 manages a virtual-printer queue (logical queue in FIG. 7), member printer queues (printer queues in FIG. 7), a virtual printer's logical port (logical port in FIG. 7), and member printers' logical ports (output ports in FIG. 7) for group printers (virtual printers) and member printers (real printers). It reports appropriate information to the Print Manager 623 according to a specified printer.

In Step S1605, it is judged whether the printer processed in Steps S1601 to S1604 is a group printer (virtual printer) or member printer (real printer). If the printer is judged to be a virtual printer, the processing goes to Step S1606. Otherwise, the processing goes to Step S1613. In this way, by managing and displaying a printer list for specifying a virtual printer or member printer (real printer), it is possible to judge which is selected, a group printer (virtual printer) or member printer (real printer), from the displayed printer list and switch between information for virtual printers and information for member printers according to this judgment. This allows the user to handle virtual printers and real printers similarly.

In Step S1606, the type of the virtual printer (virtual printer's mode type in FIG. 18) is determined. Specifically, it is judged whether the output method of the virtual printer is proportionally distributed printing, color/monochrome distributed printing, automatic proxy printing, or broadcast printing.

In Steps S1607 and S1608, a UI is displayed according to the type of output method determined in Step S1606 (FIG. 20 described later may be cited as an example in the case of distributed printing). The UI display is acquired by inquiring of the print job control system in this system about the type of output method based on identification information on the selected printer. Specifically, in response to an inquiry about the printer name, the print job control system returns the virtual printer's mode type 1802 and printer driver name (model name) 1902 for the printer name learned with reference to 1801 in FIG. 18 and 1901 in FIG. 19. Incidentally, the type of output method corresponds to the virtual printer's mode type (distributed printing, broadcast printing, color/monochrome distributed printing, or broadcast printing). Then, information needed to display a UI according to the acquired type of output method is read out of a holder and the UI is displayed based on the information read out.

In Step S1609, member printers associated with the virtual printer are enumerated. This process of enumeration is carried out, for example, by identifying and displaying member printers shown in an "Output Device" field in FIG. 20. The member printers (real printers) identified here corresponding to the virtual printer (group printer) are the member printers registered via the user interface shown in FIGS. 9 or 11. Member printers can be identified for each type of virtual printer registered via FIGS. 9 or 11.

More preferably, member printers registered on a secondary basis using the check boxes 1007 on the user interface in FIG. 10 may be provided when a predetermined type of virtual printer is specified to be selected. This will allow the user to obtain more precise information about a member printer in question.

In Step S1610, event registration is made with the Job Control Print Service 622 concerning the member printers enumerated in Step S1609, making it possible to monitor status changes of the member printers whenever necessary.

Figure 38:
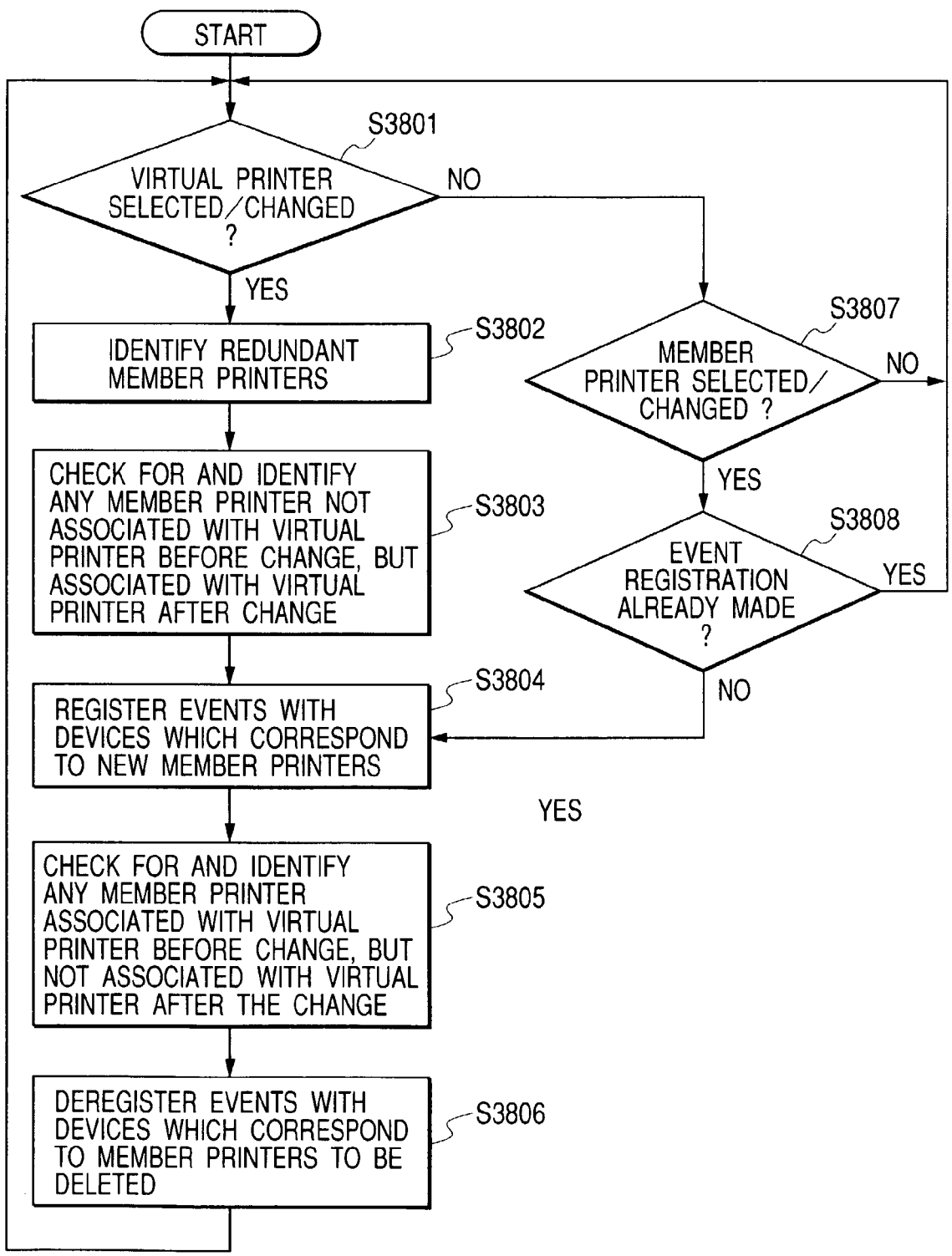
FIG. 38 is a flowchart showing processes performed by Job Control Print Service 622 to make event registration with a device.

Details of Step S1610 are shown in a flowchart in FIG. 38. After the event registration, the Job Control Print Service 622 registers events with the devices concerned, using the mechanism described with reference to FIG. 6, to request them to report their status. The event registration with devices is the client's process of requesting the devices to report any predetermined status change detected by the devices. Event notification requests issued to devices may contain client information such as the client's IP address, owner name, and computer name as well as information about types of status such as jam and other errors desired to be reported. If periodic status notification is requested from a device, status similar to the above may be reported.

The Job Control Print Service 622 avoids registering events redundantly with devices with which the events have already been registered.

Then, the status reported by the devices based on the device event registration is reported by the Job Control Print Service 622 to the Print Manager 623. These processes make it possible to register events efficiently with a large number of devices used for distributed, proxy, or broadcast printing, and thus eliminate wasteful status monitoring needed as a result of superfluous event registration.

If it is judged that a predetermined printer has been selected, the process of Step S3801 is carried out. In Step S3801, any selection/change of a virtual printer is watched for. If a virtual printer is selected/changed, redundant member printers between the virtual printers before and after the selection/change are checked for and identified in Step S3802. In Step S3803, any member printer not associated with the virtual printer before the change, but associated with the virtual printer after the change is checked for and identified. In Step S3804, events are registered with the devices which correspond to identified new member printers. In Step S3805, any member printer associated with the virtual printer before the change, but not associated with the virtual printer after the change is checked for and identified as a member printer to be deleted. In Step S3806, the devices which correspond to the member printers to be deleted are instructed to deregister device events.

On the other hand, if the answer in Step S3801 is No, it is checked whether any member printer has been selected/changed. Incidentally, a member printer here may be defined as a normal printer placed in one to one correspondence with a discrete device. If the answer in Step S3807 is Yes, it is judged in Step S3808 whether events have already been registered. If the answer in Step S3808 is No, possible causes include a case in which events have already been registered with the member printer as a result of event registration with a predetermined virtual printer associated with the member printer.

For example, if a virtual printer for an output method is selected for distributed printing (proportional distribution in the figure) via a user interface, such as the one shown in FIG. 20, on a client's display (S3801—Yes), Printer A and Printer C are identified in Step S1609 and the Print Manager 623 requests the Job Control Print Service 622 to make device event registration with Printer A and Printer C.

Then, the Job Control Print Service 622 makes a request to report device status and status changes via the job control server 630 (S3804). It is assumed here that a virtual printer has been selected for the first time, and Steps S3805 and S3806 are omitted.

If a virtual printer for color/monochrome distributed printing is selected via the user interface shown in FIG. 20 (S3801), the Print Manager 623 requests the Job Control Print Service 622 to make event registration with devices: Printer B and Printer C.

The Job Control Print Service 622 makes event registration with Printer B and thereby requests status/status-change notification from Printer B (S3804), but it does not request status/status-change notification from (make event registration with) Printer A because it is judged (S3802) that status/status-change notification has already been requested from (event registration has already been made with) Printer A. In other words, from among the member printers identified based on the specified/changed virtual printer, member printers which coincide with member printers associated with the virtual printer before the change are distinguished from new printers, and the Job Control Print Service 622 omits making device event registration with the duplicate member printers. In Step S3805, any member printer associated with the virtual printer before the change, but not associated with the virtual printer after the change is checked for and identified. Device events are deregistered with the identified member printers (S3806).

In this way, the execution of the flowchart in FIG. 38 makes it possible to avoid any redundant event registration with devices resulting from a change of virtual printer or change of specified printer from a virtual printer to a member printer. This provides the advantage that loads on the device side can be reduced. Also, from among the member printers associated with the virtual printer after the change, those member printers which are not associated with the virtual printer before the change are extracted, and event registration is made only with the extracted member printers. This reduces processing loads on the client side as well, compared to methods which register events with all the member printers associated with the virtual printer after the change using a conventional mechanism for registering and deregistering events with individual printers. Furthermore, there are marked advantages: since events are deregistered with any member printer associated with the virtual printer before the change, but not associated with the virtual printer after the change, wasteful monitoring of device status can be eliminated; and since event registration with devices is deleted efficiently, the loads on the device side can be reduced.

The above applies similarly when a virtual printer for broadcast printing or proxy printing is selected or a member printer (Printer A, B, C, etc.) is selected directly via a user interface (FIGS. 20 to 24).

Incidentally, although event registration has been described with reference to FIG. 38, in a configuration in which the Job Control Print Service 622 monitors the status of devices by polling, polling-based status monitoring of devices which correspond to new member printers may be registered in Step S3804 and polling-based status monitoring of devices which correspond to member printers marked for deletion may be deregistered (stopped) in Step S3806. In that case, it will be judged in Step S3808 whether polling-based status monitoring of devices has already been registered.

Returning to FIG. 16, supplementary information about an output printer is acquired in Step S1611. The supplementary information here can be, for example, "Installation site" and "Proportion" in FIG. 20. Supplementary information on an appropriate printer is acquired by the Job Control Print Service 622 from the Print Manager 623.

Figure 22:
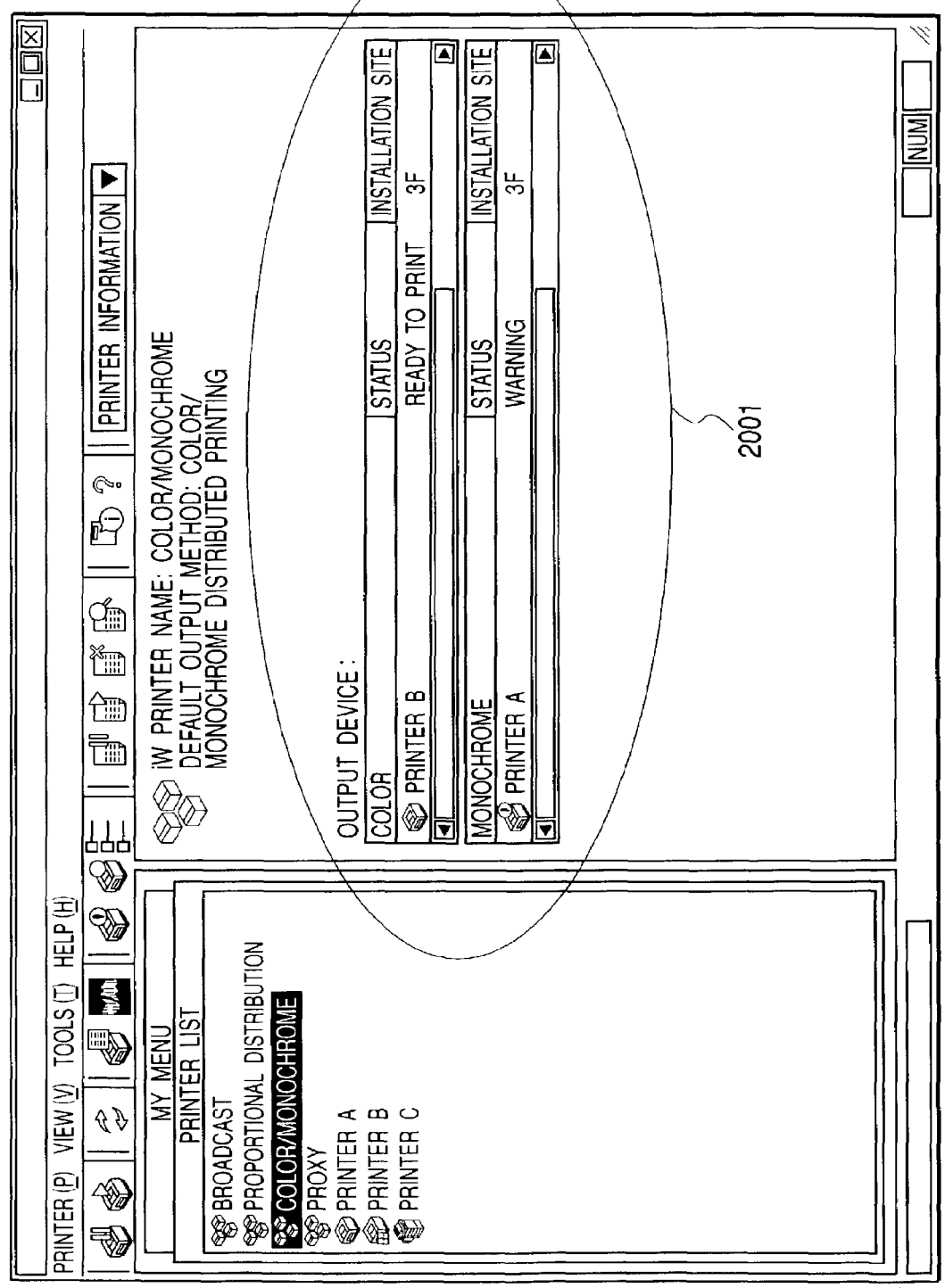
FIG. 22 is a diagram showing how a UI is displayed by Print Manager when a virtual printer (group printer)) is selected.

If some type of virtual printer is selected (available types include at least a virtual printer for distributed printing, proxy printing, or broadcast printing), member printers of the selected type are identified and status information about the identified member printers is extracted and displayed via the processes of Steps S1606 to S1609 described above. Thus, by simply specifying a virtual printer of a predetermined type, the user can easily obtain detailed information about the member printers associated with the specified virtual printer. FIG. 22 shows an example of member printers (2201) displayed when a virtual printer for color/monochrome distributed printing is selected while FIG. 23 shows an example of distributed printers (member printers) displayed when a virtual printer for proxy printing is selected.

Figure 21:
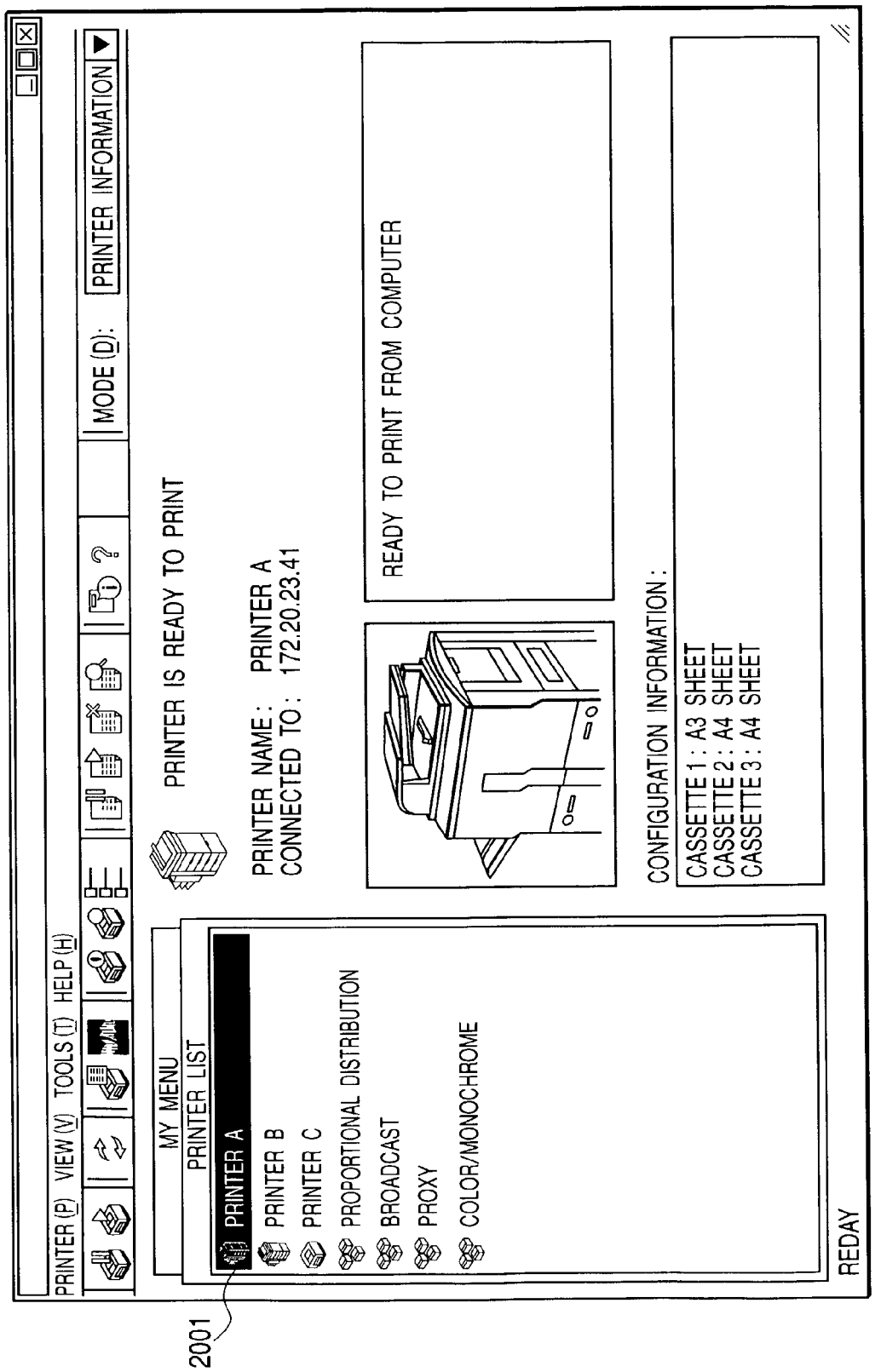
FIG. 21 is a diagram showing an example of how a UI is displayed by Print Manager when a real printer (member printer) is selected.

If the answer in Step S1605 is No, configuration information and status of the selected printer is acquired (Steps S1613 and S1614) and the acquired information is displayed in Step S1615. For example, FIG. 21 shows a user interface example displayed in Step S1615.

Figure 23:
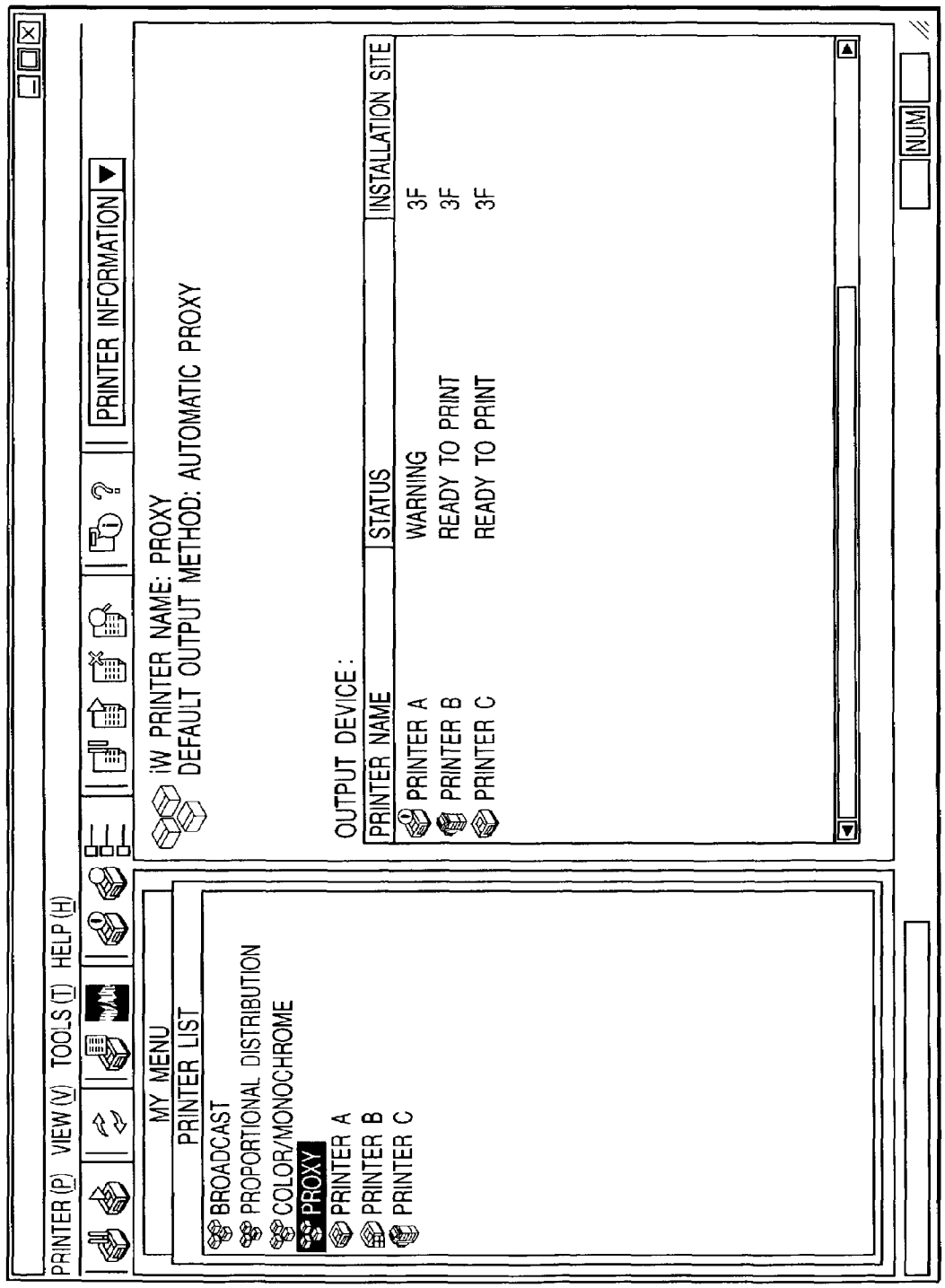
FIG. 23 is a diagram showing how a UI is displayed by Print Manager when a virtual printer (group printer) is selected.

In this way, according to the flowcharts in FIGS. 14 to 16, member printers associated with a virtual printer are identified and information about the identified member printers is displayed, thereby implementing interfaces such as those shown in FIGS. 20, 22, and 23. This makes it easy for the user to keep track of the status of member printers associated with the virtual printer. For example, this is useful for second registration of member printer drivers (temporary addition/deletion of member printers registered on a primary basis) described above.

Actual display is implemented based on information acquired in previous steps.

Figure 17:
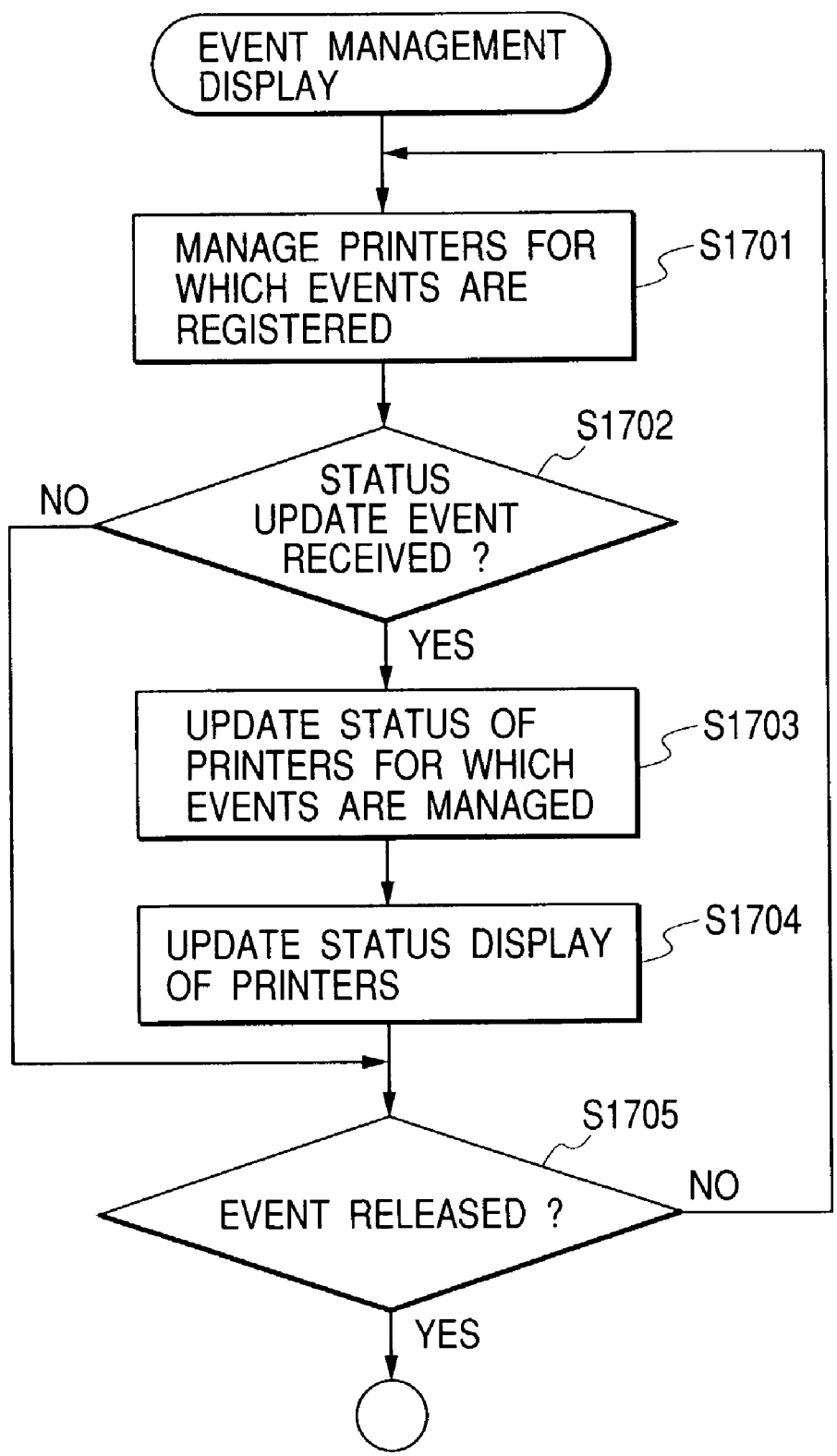
FIG. 17 is a flowchart of a printer information update process carried out by event notification management.

Next, processes shown in FIG. 17 will be described. FIG. 17 illustrates event monitoring resulting from the event registration made in Step S1405 in FIG. 14 or Step S1601 in FIG. 16 described above. The process of event monitoring is carried out by the Print Manager 623 shown in FIG. 6 (carried out as a CPU, central processing apparatus, installed in an information processing apparatus reads program code out of a nonvolatile storage means such as a ROM or HD and executes it).

First, in Step S1701, the printers subject to event registration are managed.

Then, in Step S1702, it is judged whether a status update event is received. If the answer is Yes, the processing goes to Step S1703. If the answer is No, the processing goes to Step S1705.

In Step S1703, the status of the printers concerned is updated. In Step S1704, the status display of the printers is updated in accordance with the status update in Step S1703.

In Step S1705, it is judged whether events have been deregistered. If the answer in Step S1705 is No, possible causes include a case in which the managed printers have finished printouts. In that case the event monitoring of the printers concerned not to be monitored are cancelled. In this way, through the execution of the flowchart in FIG. 17, job information about member printers such as those shown in FIGS. 20 to 24 is updated whenever necessary. Furthermore, the latest information about an original job (parent job) can be displayed based on information about the jobs run by the member printers.

Figure 24:
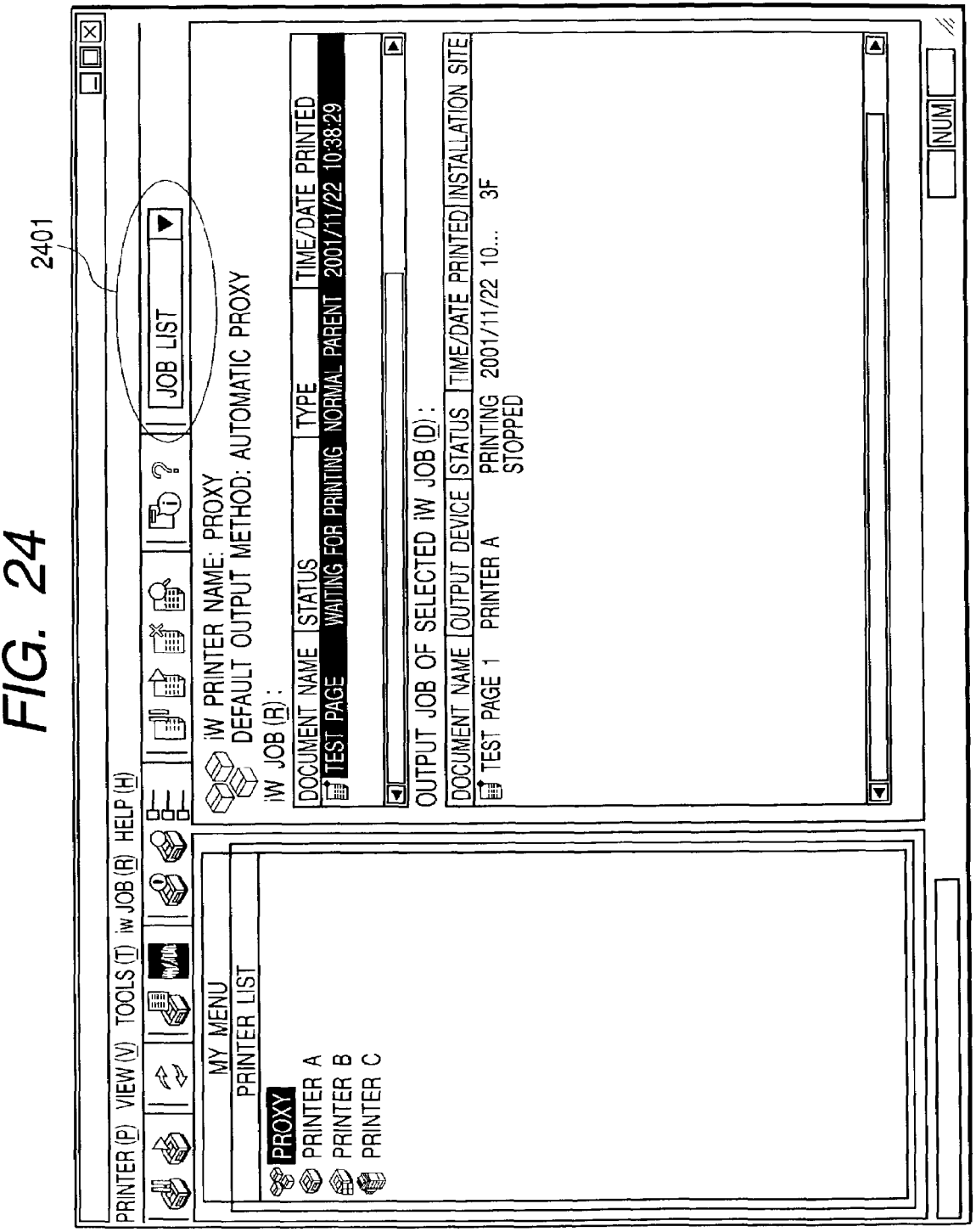
FIG. 24 is a diagram showing how a UI is displayed by Print Manager when management mode is switched to Job List.
Figure 25:
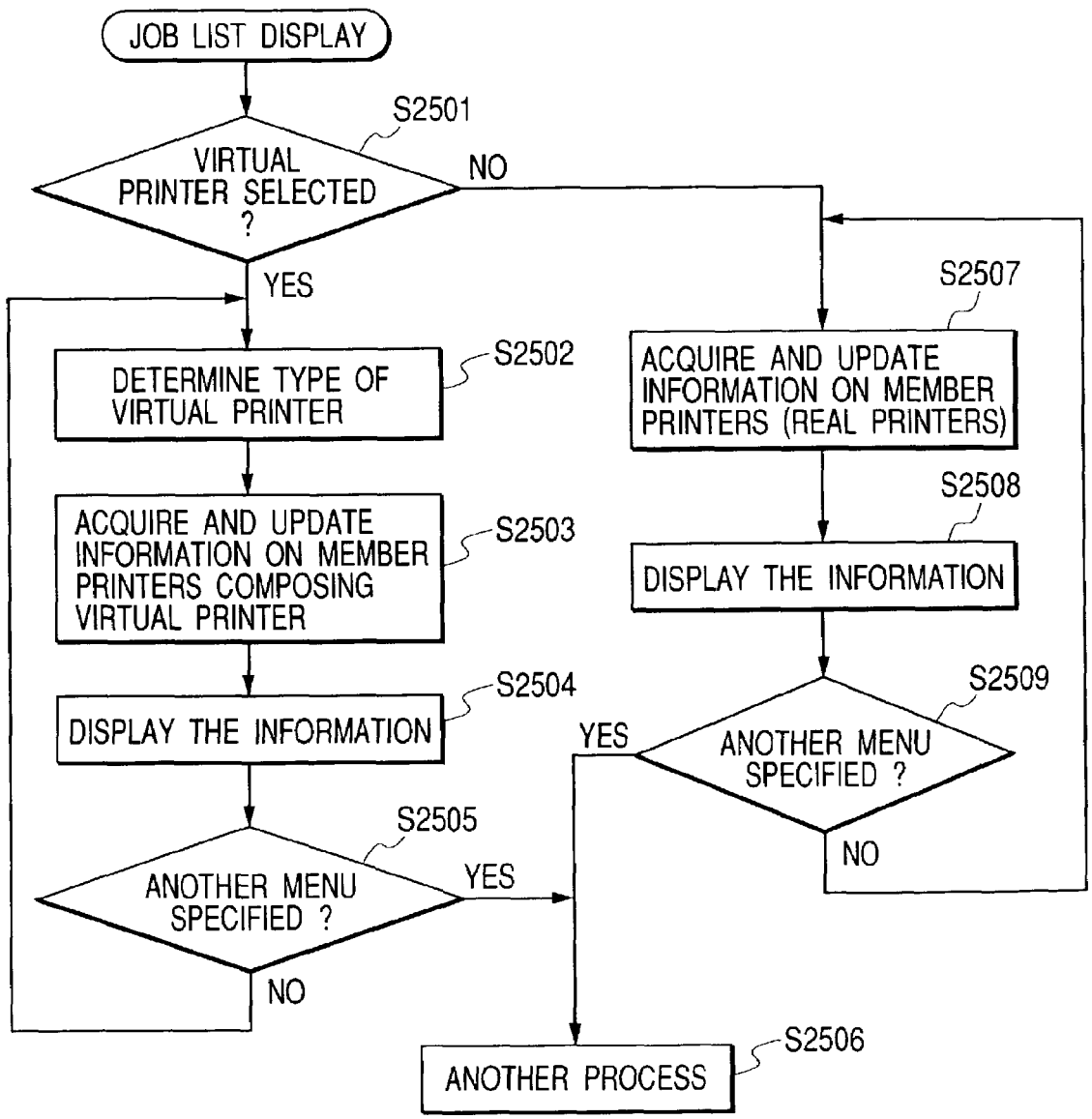
FIG. 25 is a management control flowchart when job list display is specified.

Next, with reference to FIGS. 24 to 25, processes performed by the Job Control Print Service 622 will be described further. A case in which "Printer Information" mode is selected has been described above, and now with reference to FIG. 25, description will be given of a case in which "Job List" mode is selected (when it is judged in S1705 that "Job List" is selected).

Even if the mode is changed from "Printer Information" (shown in FIG. 20) to "Job List" (shown in FIG. 24), the Printer List menu presents a list of available printers consisting of both virtual and real printers.

In Step S2501, it is judged whether a virtual printer is selected from the printer list.

If the answer is Yes, the processing goes to Step S2502. If the answer is No, the processing goes to Step S2507.

In Step S2502, the type (virtual printer for proxy printing in the case of FIG. 24) of virtual printer selected in Step S2501 is recognized. Then, member printers are identified to compose a virtual printer of the type identified according to the recognition in Step S2502.

In Step S2503, not only member printers are identified, but also information about the member printers is acquired. Information about member printers includes information about the devices which correspond to the member printers, status of jobs on the devices, and job names.

In Step S2504, the information acquired in Step S2503 is displayed. In Step S2505, it is judged whether another menu is specified. If the answer is No, the process is repeated from Step S2502.

On the other hand, if a printer other than a virtual printer is selected, i.e., real printers (actual individual member printers) are selected in Step S2501, information about the specified member printers including information about the devices which correspond to the member printers, status of jobs on the devices, and job names are acquired (S2507) and displayed (S2508). If it is judged in Step S2509 that no other menu is selected, the processing goes to Step S2507. If the process is configured such that the processing goes to Step S2501 when the answer is No in Step S2505 or S2509, switching between a virtual printer and real printer can be accommodated.

As described above the present invention provides a device management mechanism for managing printers easily in a printing system such as a distributed printing system which employs a plurality of printers.

Also, the present invention makes it possible to collectively monitor device information about a plurality of printers in a distributed printing system. Therefore, in managing information about the distributed printing system, the present invention eliminates the need for the user to go through the process of remembering the devices which compose the distributed printing system, selecting the devices in sequence, and obtaining information about the selected devices.

The present invention has made it possible to monitor one virtual job unlike conventional technologies which monitor individual output printers separately.

(Second Embodiment)

In the first embodiment, description has been given of a case in which "Printer Information" mode is selected in the flowchart of FIG. 15 and a case in which "Job List" mode is selected. In a second embodiment, detailed description will be given further of a case in which "Job List" mode is selected in the flowchart of FIG. 15.

Incidentally, the mechanisms in FIGS. 1 to 14 according to the first embodiment similarly apply to the second embodiment, and thus detailed description thereof will be omitted.

Figure 26:
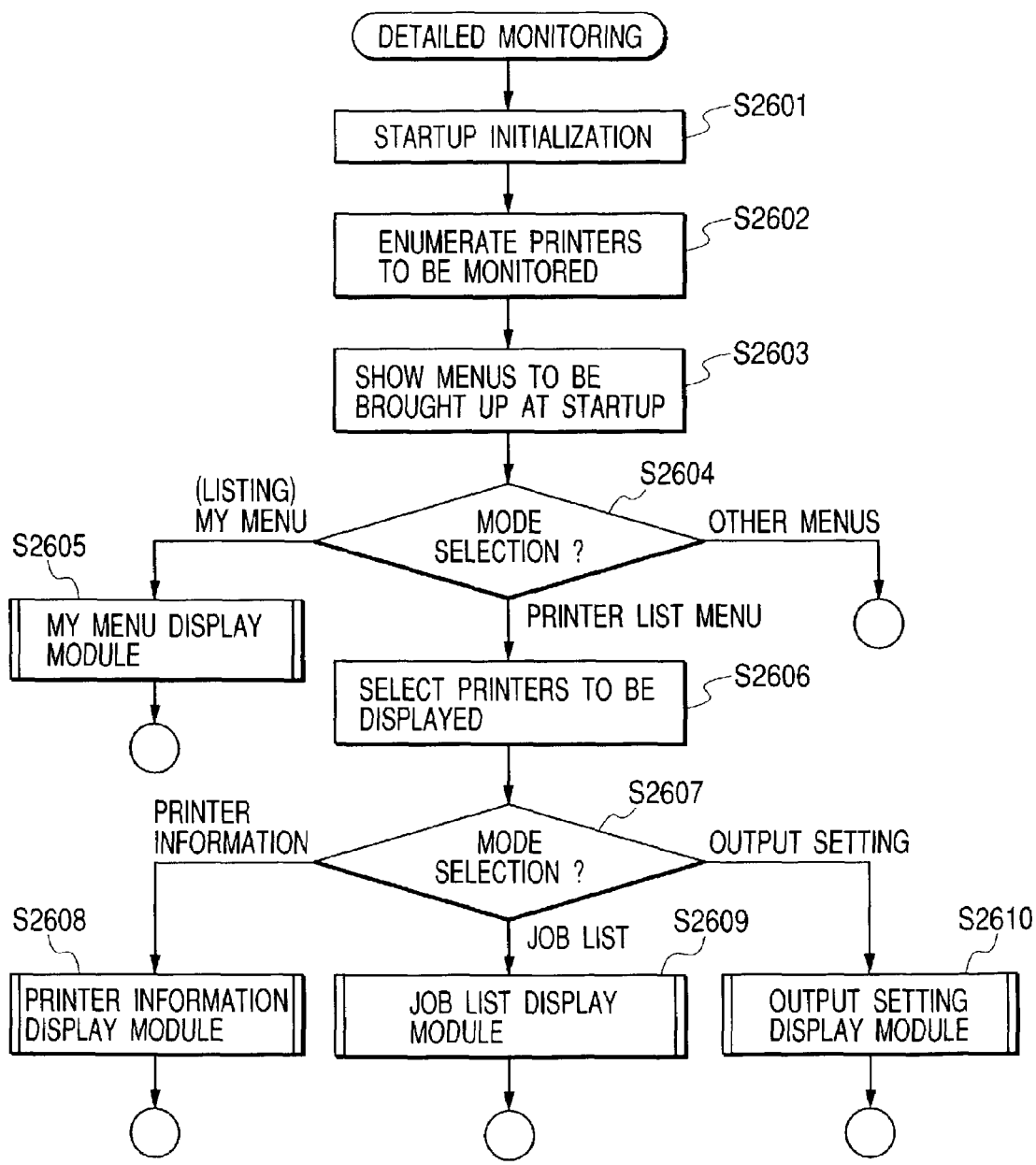
FIG. 26 is a control flowchart of detailed monitoring.

FIG. 26 details the process of Step S1408 in the flowchart of FIG. 14 according to the first embodiment.

First, in Step S2601, a startup initialization process is carried out. This process consists of various initialization processed needed to bring up, for example, a screen such as the one shown in FIG. 33 (described later).

Figure 33:
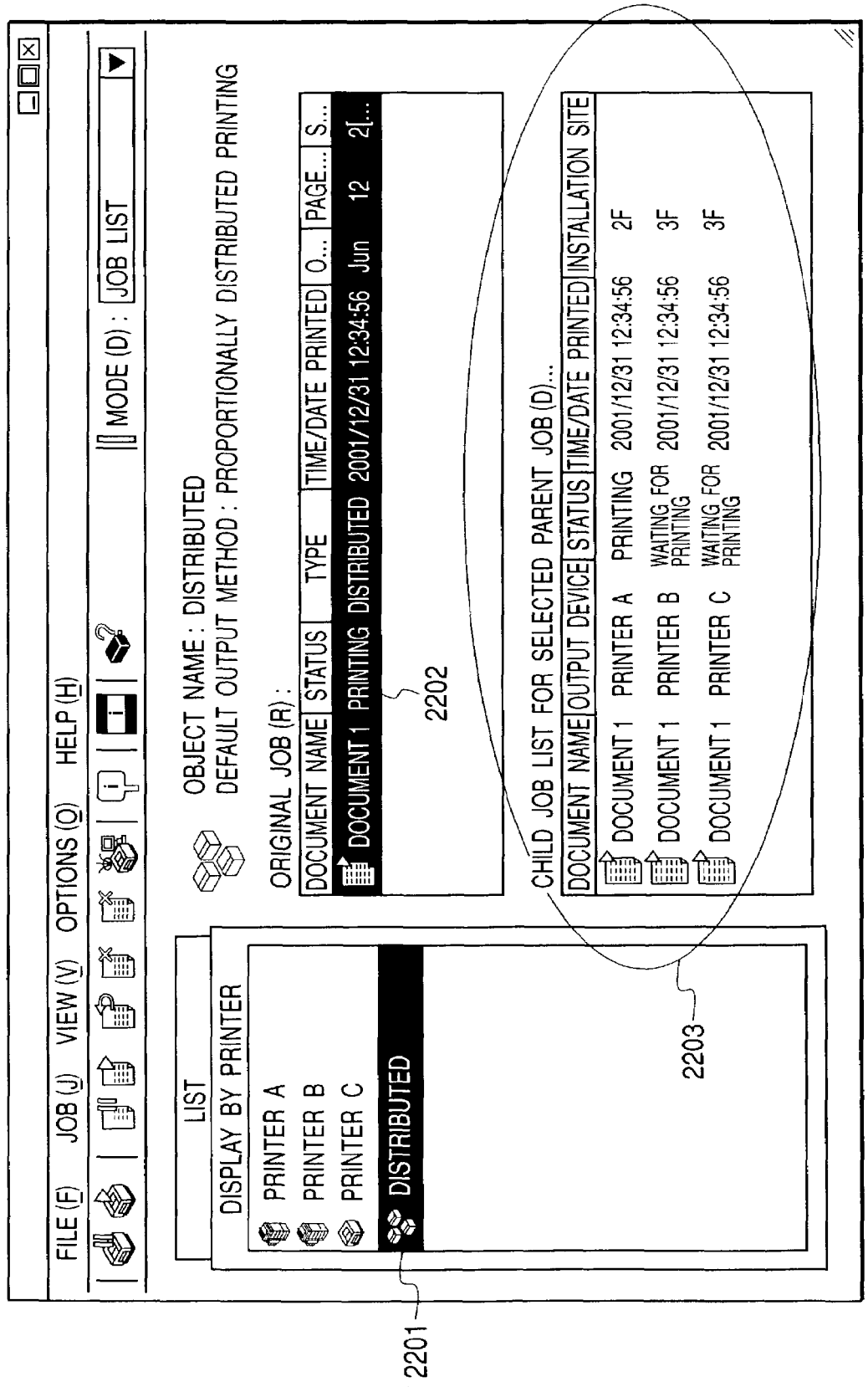
FIG. 33 is a diagram showing an example of a job list displayed when a virtual printer (distributed printing) is selected.

In Step S2602, the printers to be monitored are enumerated. This process of enumeration includes acquiring information about the printers to be monitored (including both group printers (virtual printers) and member printers (real printers)) from the Job Control Print Service 622 and displaying the acquired printer list. For example, a printer list shown in the "Display by Printer" field in FIG. 33 is displayed as a result of the process in Step S2602. It is characteristic of these printer lists to contain both virtual printers and real printers. This is also true for printer lists shown in the "Display by Printer" field in FIGS. 34 and 35. Each of the virtual printers and member printers in the lists accompanies an icon which represents the status of the given printer. The status icons are changed with changes in the status of the printers (virtual printers/real printers). The status of a virtual printer can be determined, for example, by "ORing" the statuses of its member printers, and then the icon which corresponds to the determined status is selected. In that case, if any of the member printers have "Spooler Stopped" status, the corresponding virtual printer will have "Spooler Stopped" status, and thus a "Spooler Stopped" status icon. Also, if any of the member printers have "Error" status, the corresponding virtual printer will have "Error" status, and thus an "Error" status icon.

In Step S2603, a menu displayed at startup is specified. More particularly, menus assigned to menu items brought up at program startup are displayed in such a way that they can be changed.

In Step S2604, it is judged whether a mode has been specified to be selected. If it is judged that "MY Menu" is specified, the processing goes to Step S2605. If it is judged that "Printer List Menu" is specified, the processing goes to Step S2606. Incidentally, the selection specification of a mode here means selection specification of a predetermined menu.

In Step S2606, it is judged what printer has been specified to be selected from among the printers enumerated in Step S2602 and the selected printer is recognized.

In Step S2607, it is judged what type of mode is currently selected. Then, the display format of the information about the printer recognized as currently selected in Step S2606 is varied according to the selected mode type. A mode is selected here, for example, by being pointed to in "Mode (D):" field in FIG. 33.

If it is judged in Step S2607 that "Printer Information" mode is selected, the processing goes to Step S2608; if it is judged that "Job List" is selected, the processing goes to Step S2609; and if it is judged that "Output Settings" is selected, the processing goes to Step S2610. In Step S2610, printer setup information (paper size, default resolution, etc.) selected in Step S2606 is displayed. Incidentally, detailed description of Step S2609 will be provided later with reference to FIG. 27.

In this way, through the processes in the flowchart of FIG. 26, it is possible to display information about one or more predetermined printers (including virtual printers and real printers) selected from among the to be monitored printer(s) enumerated in Step S2602, by switching among various information, Printer Information, Job List, Output Settings, etc., according to the selected mode.

In Step S2606, although a mixture of group printers (virtual printers) and real printers (member printers) is listed, the user can also select a printer without being aware of whether it is a virtual printer or real printer and obtain optimum printer information, job list information, or output settings information depending on what mode is selected.

Figure 27B:
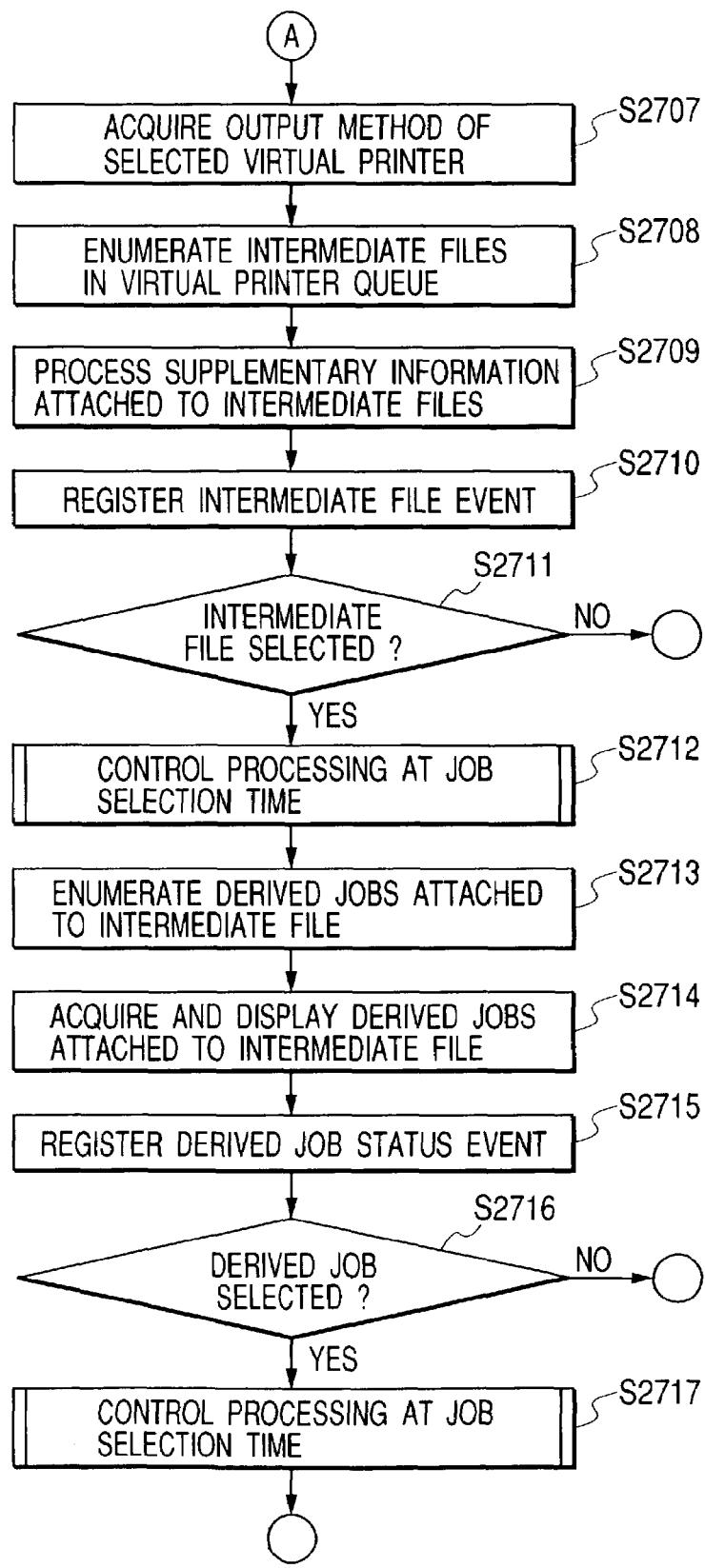
FIG. 27 is comprised of FIGS. 27A and 27B showing a flowchart of a printer manager control program when a virtual printer (group printer) or real printer (member printer) is selected.

Next, FIGS. 27A and 27B will be described. FIGS. 27A and 27B are flowcharts which details the process of Step S2609 in FIG. 26 described above.

First, in Step S2701, a status event of the selected printer is registered. Specifically, status changes of the printer selected in Step S2606 of FIG. 26 are requested to be reported as events. In practice, the Print Manager 623 in FIG. 6 may request the Job Control Print Service 622 to notify it of events. Incidentally, the selected printer in Step S2701 may be a virtual printer or real printer.

Then, in Step S2702, an initialization process is carried out to obtain different information depending on the printer type recognized in Step S2701: whether it is a group printer (virtual printer) or member printer (real printer) or whether is an ink jet printer, laser beam printer, or network-enabled digital multifunction device.

In Steps S2703 and S2704, queue information and port information for the printer selected in Step S2606 are acquired from the Job Control Print Service 622.

More specifically, if the printer specified to be selected in Steps S2702 and S2703 is a virtual printer (group printer), corresponding queue and port information is acquired. On the other hand, if the printer specified to be selected is a member printer (real printer), queue and port information corresponding to the member printer is acquired. To identify a queue and port, management information such as the one shown in FIG. 29 is referenced based on information for identification of the specified printer (printer name, printer ID, etc.), and then information needed to reference the queue and information needed to reference the port are singled out of the management information.

The Job Control Print Service 622 manages a virtual-printer queue (logical queue in FIG. 7), member printer queues (printer queues in FIG. 7), a virtual printer's logical port (logical port in FIG. 7), and member printers' logical ports (output ports in FIG. 7) for group printers (virtual printers) and member printers (real printers). It reports appropriate information to the Print Manager 623 according to a specified printer.

Queue information includes job attributes of documents in a printer queue, such as document names, document size, and the number of copies, as well as job status such as Spooling and Printing. On the other hand, port information includes, for example information as to whether communications functions are in their normal state.

In Step S2705, event registration is made so that any status change in the printer queue of the printer specified to be selected will be reported.

In Step S2706, it is judged whether the printer processed in Steps S2701 to S2705 is a group printer (virtual printer) or member printer (real printer).

If the printer is judged to be a virtual printer, the processing goes to Step S2707. Otherwise, the processing goes to Step S2718.

In Step S2707, the type of the virtual printer is determined. Specifically, it is judged whether the output method of the virtual printer is proportionally distributed printing, color/monochrome distributed printing, automatic proxy printing, or broadcast printing with reference to management information such as the one shown in FIG. 29.

In Step S2708, intermediate files managed in the virtual-printer queue are extracted (enumerated). Consequently, intermediate files (may also be called as original jobs or parent jobs) related to issued virtual jobs are listed.

In Step S2709, supplementary information attached to the intermediate files is processed. The supplementary information here can be, for example, the date and time of printing.

In Step S2710, the Print Manager 623 registers event notification about status changes in the intermediate files with the Job Control Print Service 622 (print control program).

In Step S2711, it is judged whether a predetermined intermediate file (underlying parent job (intermediate file) before distribution, proxy, or broadcast) has been specified to be selected from among the intermediate files enumerated in Step S2708. If the answer is Yes, processing at job selection time is carried out in Step S2712 and derived jobs attached to the intermediate file are enumerated in Step S2713.

The jobs derived from the intermediate file are identified based on supplementary information attached to an intermediate file 2004 by checking the intermediate file name 2001 or intermediate file ID of the intermediate file specified to be selected in Step S2711 against the management information such as the one shown in FIG. 31. In other words, the supplementary information attached to the intermediate file 2004 contains information for identifying derived jobs of the predetermined intermediate file. Also, job status of derived jobs and information about output printers can be identified based on information 2007 in FIG. 31. Besides, various information about a derived job can also be recognized and displayed by referring to management information for the derived job (shown in FIG. 32) identified by a derived job ID which in turn is identified based on 2004.

In this way, derived jobs of a virtual job (predetermined original job) are extracted (enumerated) and a derived-job list 2203 shown in FIG. 33 is displayed together with output printers and status information (S2714). When tracking a job, real printers can be displayed for confirmation using an "Output Printer" name attached to the job.

In Step S2715, in relation to status changes of the derived job, an event request is registered.

In Step S2716, it is judged whether a predetermined derived job is selected from the derived jobs enumerated and displayed in Step S2714. If the answer is Yes, the processing goes to Step S2717.

In Step S2706, if it is judged that a member printer (real printer) rather than a virtual printer is selected, job information (job names) about the jobs queued on the selected printer is acquired in Step S2718, event registration is made (S2719), supplementary information attached to the enumerated jobs is acquired (S2720), and the acquired job names are displayed in Step S2721 together with the attached information (S2722). In Step S2723, control processing at job selection time is carried out.

In this way, it is possible to determine which is specified to be selected, a virtual printer or real printer. Then, if it is determined that a virtual printer is selected, job information for virtual printers can be displayed; and if it is determined that a real printer is selected job information for real printers can be displayed. As information for a virtual printer, both information about an original job (intermediate file) (2202 in FIG. 33) and information about jobs derived from the original job are displayed, allowing the user to easily understand the progress of the virtual job as a whole and conditions of each derived job associated with the virtual job.

Figure 28:
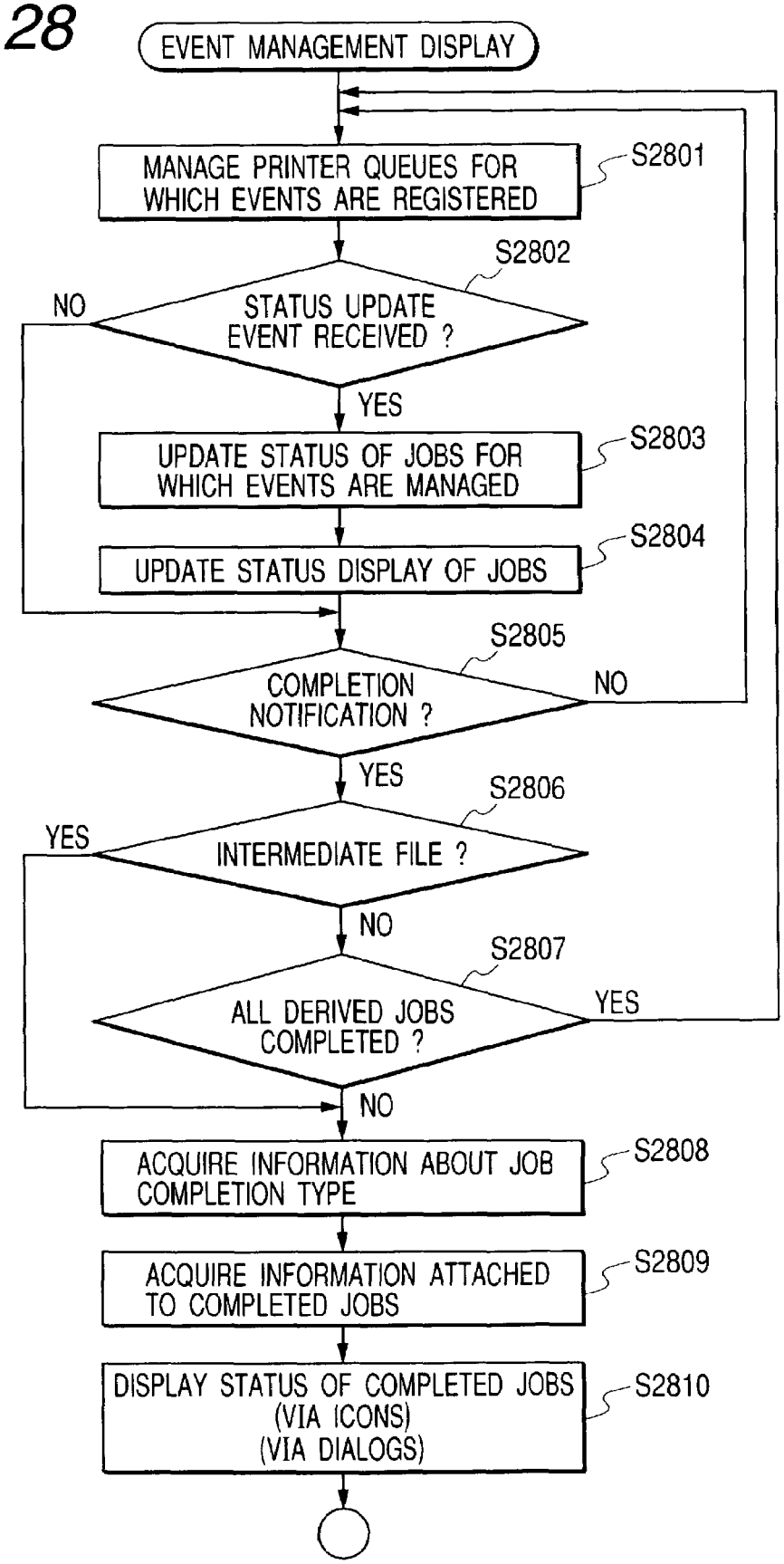
FIG. 28 is a flowchart of a printer information update process carried out by event notification monitoring.

Next, processes shown in FIG. 28 will be described. FIG. 28 illustrates event monitoring resulting from event registrations. They are carried out by the Print Manager 623 shown in FIG. 6 as a CPU, central processing apparatus, installed in an information processing apparatus reads program code out of a nonvolatile storage means such as a ROM or HD and executes it.

In Step S2802, it is judged whether the event managed in Step S2801 is a status update event. If the answer is Yes, the status of the jobs concerned are updated, and so is corresponding display.

On the other hand, if the answer in Step S2802 is No, it is judged in Step S2805 whether the event is a completion notification. If the answer is Yes, the processing returns to Step S2801. If the answer is No, the processing goes to Step S2806.

In Step S2806, it is judged whether the completion notification event in Step S2805 concerns an intermediate file. If the answer is Yes, the processing goes to Step S2808. If the answer is No, it is judged in Step S2807 whether the completion notification event concerns derived jobs. If the answer in S2807 is Yes, the processing goes to Step S2801, but if the answer is No, the processing goes to Step S2808.

In Step S2808, information about job completion type is acquired; in Step S2809, information attached to the completed jobs is acquired; and in Step S2810, the Completed status of the jobs is displayed. Icons or dialogs may be used for this display.

Figure 34:
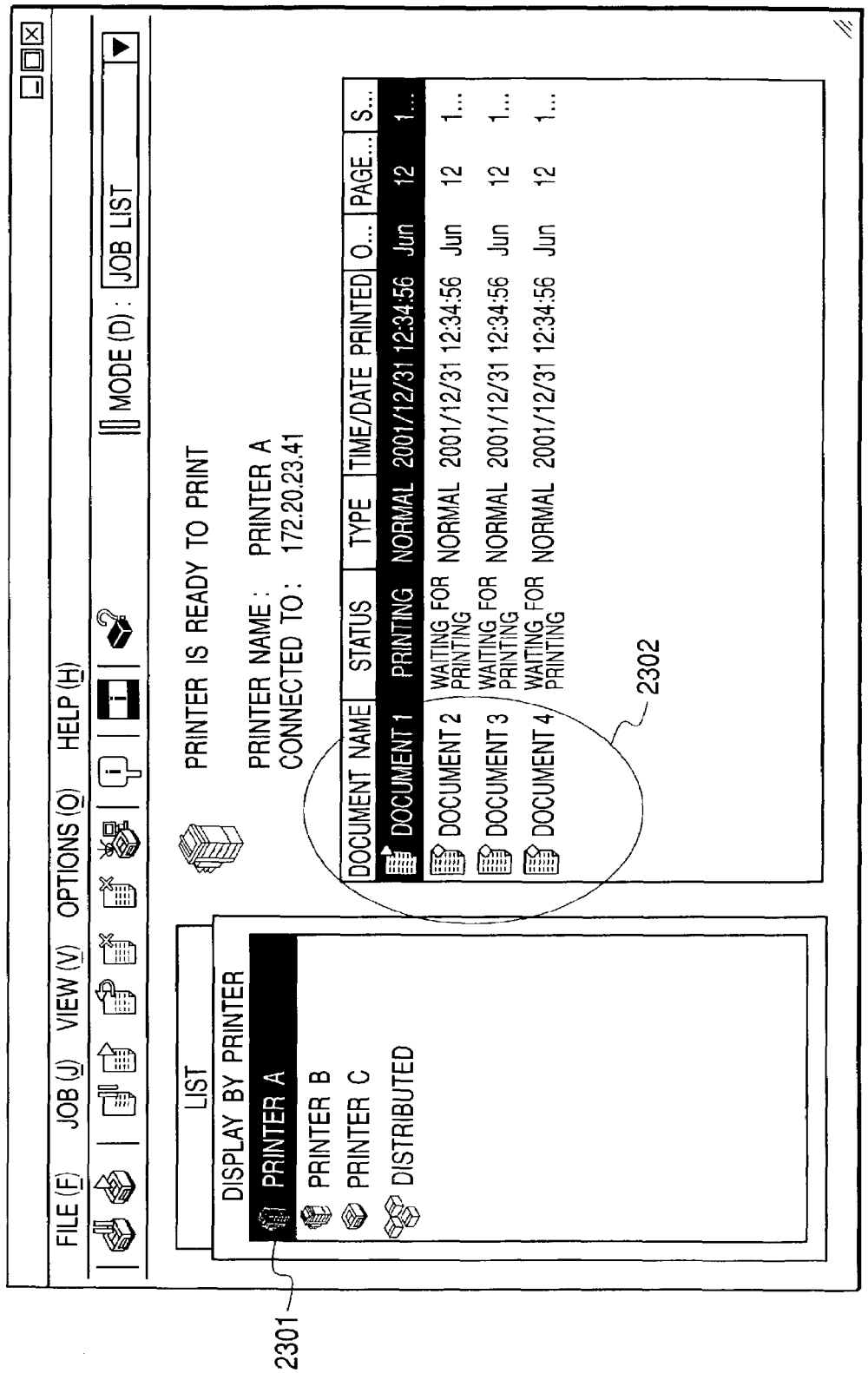
FIG. 34 is a diagram showing an example of a job list displayed when a real printer (member printer) is selected.
Figure 35:
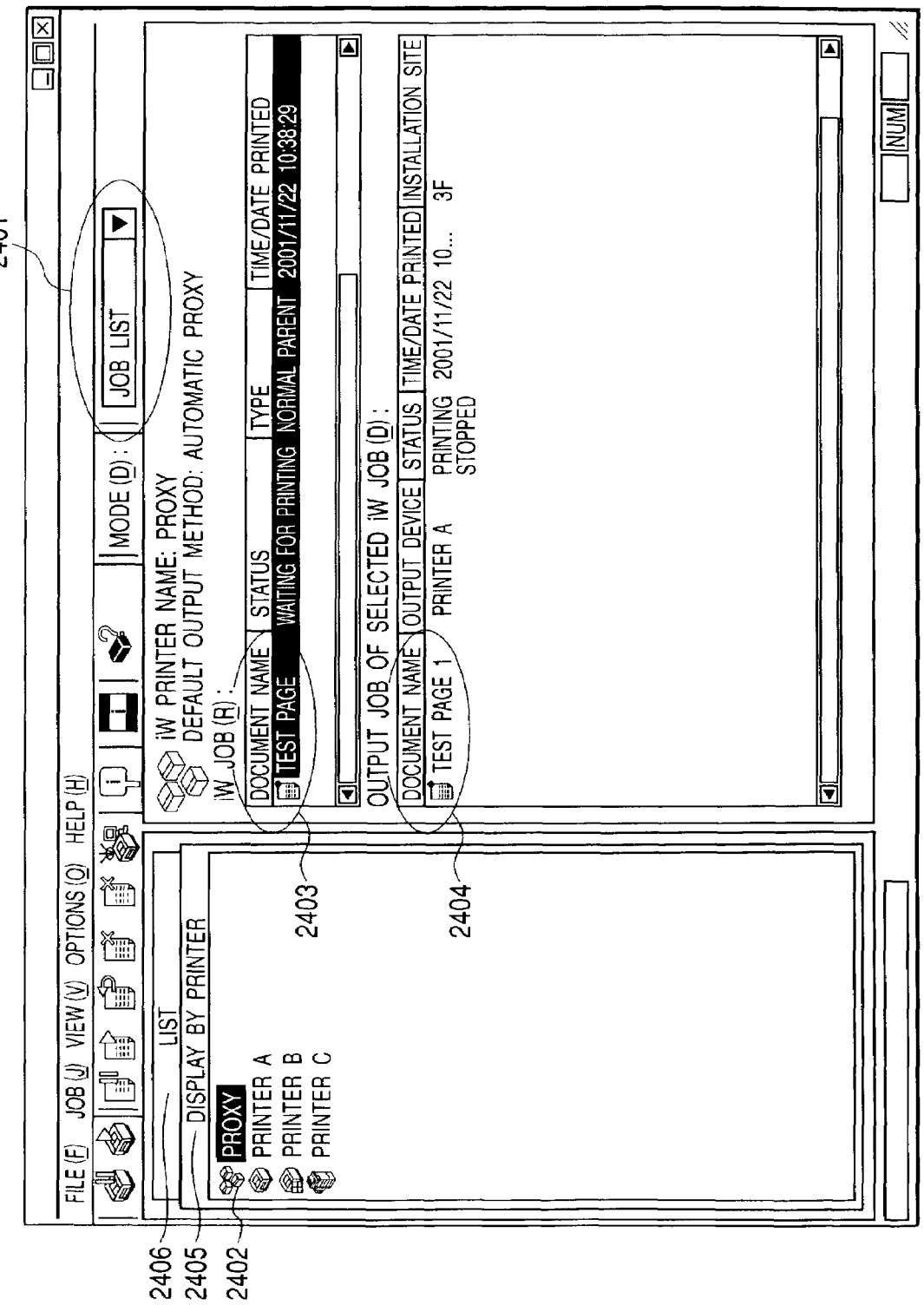
FIG. 35 is a diagram showing an example of a job list displayed when a virtual printer (proxy printing) is selected.

In this way, through the execution of the flowchart in FIG. 28, job information about member printers such as those shown in FIGS. 33 to 35 is updated whenever necessary. Furthermore, the latest information about the original job (parent job) can be displayed based on information about the jobs run by the member printers.

Now, FIGS. 33 to 35 will be described.

Referring to FIG. 33, the "Display by Printer" field shows a virtual printer (termed "Distribution" in the figure) for distributed printing in a distributed printing system as well as a list of member printers (Printers A, B, and C) which compose the virtual printer. In FIG. 33, "Distribution" is selected.

The Job Control Print Service 622 has capabilities to generate the job status of the original job in 2202 by "ORing" the statuses of derived jobs (termed "Child Jobs" in the figure) shown in 2203 in FIG. 33 and displaying it as the representative status of the virtual distributed printing job as a whole.

For example, if the printing for all the derived jobs is completed, the status in 2202 is determined to be "Completed". If any of the derived jobs is recognized as having "Error" status, the status in 2202 is set to "Error". Also, as shown in FIG. 33, when "Waiting for Printing" and "Printing" coexist as statuses of derived jobs, the representative status of 2202 is set to "Printing". In this way, by knowing representative status, the user can readily tell the status of the distributed printing system. Representative status is also generated in a similar manner for derived jobs in typical broadcast printing, proxy printing, color/monochrome distributed printing, etc. Incidentally, when distributed printing is carried out, the original job in 2202 actually corresponds to an original intermediate file (general print file described in FIG. 6).

Although the original job display field 2202 in FIG. 33 shows only a list which corresponds to one original intermediate file, if two or more virtual jobs are issued, two or more original job display fields are presented. In that case, when a different intermediate file is specified to be selected, a list of derived jobs for that intermediate file is displayed (Steps S2711 and S2714 in FIGS. 27A and 27B). This makes it easy for the user to tell the job status of the derived jobs corresponding to each virtual job.

Besides, when displaying jobs as in FIGS. 33, 34, and 35, this control program has a filtering function to allow the user to display only his/her own jobs based on an owner name and machine name attached to each job.

FIG. 34 shows a display example brought up when a real printer is selected in FIG. 33. It shows how the screen looks after "Distribution" in FIG. 33 is changed to "Printer A".

Throughout FIGS. 33 to 35, status icons corresponding to various job statuses are displayed to the left of document names. In particular, status icons of original jobs make it easy for the user to understand the representative status of distributed printing, broadcast printing, or the like. Examples of status icons are shown in FIGS. 37 and 36.

As described above, the present invention implements a mechanism for providing appropriate job information in a print method such as distributed printing or broadcast printing which involves assigning copies/pages to be printed to a plurality of printers. For example, it makes it possible to monitor derived jobs on distributed printers efficiently, eliminating the need to monitor information about the individual printers used for distributed printing separately.

Also, since the user interfaces provided do not display information about a mixture of jobs managed by different users, the given user can readily check the jobs in his/her charge.

Furthermore, when printers of two or more types are used for distributed printing, broadcast printing, or the like, according to conventional technologies, information about each printer queue does not provide information as to whether a given job concerns distributed printing or broadcast printing. However, the present invention makes it easy to obtain member printer job information according to the type of virtual printer.

As described above, the second embodiment provides a device management mechanism which allows the user to understand job information easily in an environment where each job uses a plurality of printers.

Furthermore, the second embodiment makes it possible to manage the status of virtual jobs and derived jobs more elaborately and more efficiently than the first embodiment.

What is claimed is:

1. A printer management method comprising:
   a registering step of registering a virtual printer as a group printer which causes a plurality of real printers to execute printing as member printers;
   an obtaining step of obtaining status information, including error or warning information, about the member printers from the corresponding printers via a network;
   a determining step of determining virtual status of the virtual printer registered in said registering step by executing logical processing on the status information of the member printers obtained in said obtaining step;
   a printer list managing step of managing and displaying a printer list which includes identifications of the registered virtual printer and the plurality of real printers, wherein the identifications reflect the virtual status of the virtual printer determined in said determining step and the status information about the member printers obtained in said obtaining step;
   a judging step of judging whether the virtual printer or one of the member printers is selected by an instruction given to the displayed printer list; and
   a display control step of displaying, if said judging step judges that the virtual printer is selected, the status information about the member printers associated with the virtual printer obtained in said obtaining step, and displaying, if said judging step judges that one of the member printers is selected, the status information about the selected member printer.

2. The printer management method according to claim 1, further comprising:
   an identification step of identifying the type of the selected virtual printer; and
   an extraction step of extracting the status information about member printers associated with the type of the selected virtual printer identified in said identification step, wherein said display control step displays the information about the member printers extracted in said extraction step on a user interface which corresponds to the identified type and can be different for each identified type.

3. The printer management method according to claim 1, wherein:
the status information about member printers is based on notifications given by the printers which correspond to the member printers, according to event registration to the printers, and
the printer management method comprises an omission step of identifying member printers with which event registration should be omitted based on a comparison between a plurality of member printers associated with the selected virtual printer selected from the printer list and a plurality of member printers associated with the virtual printer before the change and omitting event registration to the printers which correspond to the identified member printers.

4. The printer management method according to claim 3, comprising an event registration instruction step of instructing event registration to new member printers identified based on the comparison between a plurality of member printers associated with the selected virtual printer selected from the printer list and a plurality of member printers associated with the virtual printer before the change.

5. The printer management method according to claim 4, comprising an event deregistration instruction step of identifying member printers from which events should be deregistered based on the comparison between a plurality of member printers associated with the selected virtual printer selected from the printer list and a plurality of member printers associated with the virtual printer before the change and instructing event deregistration to the identified member printers.

6. The printer management method according to claim 1, further comprising:
a registration changing step of temporarily changing the registration made in said registering step,
wherein said display control step displays the status information about the member printers whose registration is changed in said registration changing step.

7. An information processing apparatus comprising:
a registering unit configured to register a virtual printer as a group printer which causes a plurality of real printers to execute printing as member printers;
an obtaining unit configured to obtain status information, including error or warning information, about the member printers from the corresponding printers via a network;
a determining unit configured to determine virtual status of the virtual printer registered by said registering unit by executing logical processing on the status information of the member printers obtained by said obtaining unit;
a printer list managing unit configured to manage and display a printer list which includes identifications of the registered virtual printer and the plurality of real printers, wherein the identifications reflect the virtual status of the virtual printer determined by said determining unit and the status information about the member printers obtained by said obtaining unit;
a judging unit configured to judge whether the virtual printer or one of the member printers is selected by an instruction given to the displayed printer list; and
a display control unit configured to display, if said judging unit judges that the virtual printer is selected, the status information about the member printers associated with the virtual printer obtained by said obtaining unit, and to display, if said judging unit judges that one of the member printers is selected, the status information about the selected member printer.

8. The information processing apparatus according to claim 7, further comprising:
an identification unit configured to identify the type of the selected virtual printer; and
an extraction unit configured to extract the status information about member printers associated with the type of the virtual printer identified by said identification unit,
wherein said display control unit displays the information about the member printers extracted by said extraction unit on a user interface which corresponds to the identified type and can be different for each identified type.

9. The information processing apparatus according to claim 7, wherein:
the status information about member printers is based on notifications given by the printers which correspond to the member printers, according to event registration to the printers and the information processing apparatus comprises an omission unit configured to identify member printers with which event registration should be omitted based on a comparison between a plurality of member printers associated with the selected virtual printer selected from the printer list and a plurality of member printers associated with the virtual printer before the change and omitting event registration to the printers which correspond to the identified member printers.

10. The information processing apparatus according to claim 9, comprising an event registration instruction unit configured to instruct event registration to new member printers identified based on the comparison between a plurality of member printers associated with the selected virtual printer selected from the printer and a plurality of member printers associated with the virtual printer before the change.

11. The information processing apparatus according to claim 10, comprising an event deregistration instruction unit configured to identify member printers from which events should be deregistered based on the comparison between a plurality of member printers associated with the selected virtual printer selected from the printer list and a plurality of member printers associated with the virtual printer before the change and instructing event deregistration to the identified member printers.

12. The information processing apparatus according to claim 7, further comprising:
a registration changing unit configured to temporarily change the registration made by said registering unit,
wherein said display control unit displays the status information about the member printers whose registration is changed by said registration changing unit.

13. A computer-readable storage medium containing a computer-readable program, said program comprising:
a registering step of registering a virtual printer as a group printer which causes a plurality of real printers to execute printing as member printers;
an obtaining step of obtaining status information, including error or warning information, about the member printers from the corresponding printers via a network;

a determining step of determining virtual status of the virtual printer registered in said registering step by executing logical processing on the status information of the member printers obtained in said obtaining step;

a printer list managing step of managing and displaying a printer list which includes identifications the registered virtual printer and the plurality of real printers, wherein the identifications reflect the virtual status of the virtual printer determined in said determining step and the status information about the member printers obtained in said obtaining step;

a judging step of judging whether the virtual printer or one of the member printers is selected by an instruction given to the displayed printer list; and a display control step of displaying, if said judging step judges that the virtual printer is selected, the status information about the member printers associated with the virtual printer obtained in said obtaining step, and displaying, if said judging step judges that one of the member printers is selected, the status information about the selected member printer.

* * * * *